United States Patent
Dorovic et al.

(10) Patent No.: US 11,218,696 B2
(45) Date of Patent: Jan. 4, 2022

(54) METHOD FOR IMAGE ENCODING AND APPARATUS FOR IMPLEMENTING THE SAME USING INTERPOLATION FILTER BASED ON MOTION SPEED

(71) Applicant: ATEME, Velizy Villacoublay (FR)

(72) Inventors: Katarina Dorovic, Belgrade (RS); Elie Mora, Malakoff (FR); Mathieu Monnier, Malakoff (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 16/797,300

(22) Filed: Feb. 21, 2020

(65) Prior Publication Data
US 2020/0275097 A1 Aug. 27, 2020

(30) Foreign Application Priority Data
Feb. 21, 2019 (EP) .................................... 19305208

(51) Int. Cl.
*H04N 19/117* (2014.01)
*H04N 19/139* (2014.01)
(Continued)

(52) U.S. Cl.
CPC ......... *H04N 19/117* (2014.11); *H04N 19/139* (2014.11); *H04N 19/176* (2014.11); *H04N 19/523* (2014.11); *H04N 19/573* (2014.11)

(58) Field of Classification Search
CPC .. H04N 19/117; H04N 19/139; H04N 19/176; H04N 19/523; H04N 19/573; H04N 19/59
(Continued)

(56) References Cited

U.S. PATENT DOCUMENTS 6,728,317 B1  4/2004  Demos
7,266,150 B2  9/2007  Demos
(Continued)

FOREIGN PATENT DOCUMENTS

EP          3 306 934 A1    4/2018

OTHER PUBLICATIONS

Bjontegaard, "Calculation of Average PSNR Differences between RD-curves," Document VCEG-M33, ITU-T Video Coding Experts Group, 13th Meeting, Austin, TX, US, Apr. 2001, pp. 1-4.
(Continued)

*Primary Examiner* — Susan E. Hodges
(74) *Attorney, Agent, or Firm* — Faegre Drinker Biddle & Reath LLP

(57) ABSTRACT

A method of encoding a first image in a plurality of images of input video data, wherein the first image is divided into a plurality of pixel blocks comprises, for a current block of the first image: determining a motion speed for the current block with respect to a reference block correlated to the current block in a second image of the plurality of images, wherein the second image is distinct from the first image and was previously encoded according to an image encoding sequence for encoding the images of the plurality of images; determining an interpolation filter based on the motion speed; and using the interpolation filter for calculating fractional pixel values in the second image for a temporal prediction of pixels of the current block based on the reference block of the second image.

20 Claims, 10 Drawing Sheets

Current frame (a)

(b)

(c)

Reference frame (d)

(e)

(f)

(51) Int. Cl.
  *H04N 19/176* (2014.01)
  *H04N 19/523* (2014.01)
  *H04N 19/573* (2014.01)
(58) Field of Classification Search
  USPC .......................................................... 375/240
  See application file for complete search history.

(56) References Cited

U.S. PATENT DOCUMENTS

| | | | | |
|---|---|---|---|---|
| 8,160,149 | B2* | 4/2012 | Demos | H04N 19/537 |
| | | | | 375/240.16 |
| 8,824,553 | B2* | 9/2014 | Ameres | H04N 19/114 |
| | | | | 375/240.16 |
| 8,897,360 | B2 | 11/2014 | Cho et al. | |
| 9,319,711 | B2 | 4/2016 | Minoo et al. | |
| 2004/0228410 | A1 | 11/2004 | Ameres et al. | |
| 2008/0247462 | A1 | 10/2008 | Demos | |
| 2013/0182770 | A1 | 7/2013 | Kondo | |
| 2014/0314154 | A1 | 10/2014 | Chono | |
| 2019/0045193 | A1* | 2/2019 | Socek | H04N 19/543 |

OTHER PUBLICATIONS

Boyce et al., "JVET common test conditions and software reference configurations," Document JVET-J1010-v1, JVET of ITU-T SG16 WP3 and ISO/IEC JTC1/SC29/WG11, 10th Meeting, San Diego, CA, US, Apr. 2018, pp. 1-6.
Bross et al., "High Efficiency Video Coding (HEVC) text specification draft 7," Document JCTVC-I1003, JCT-VC of ITU-T SG16 WP3 and ISO/IEC JTC1/SC29/WG11, 9th Meeting, Geneva, CH, Apr. 27-May 7, 2012, 280 pages.
Bross et al., "Versatile Video Coding (Draft 2)," Document JVET-K1001-v6, JVET of ITU-T SG16 WP3 and ISO/IEC JTC1/SC29/WG11, 11th Meeting, Ljubljana, SI, Jul. 2018, 141 pages.
Chen et al., "Algorithm Description for Versatile Video Coding and Test Model 1 (VTM 1)," Document JVET-J1002-v2, JVET of ITU-T SG16 WP3 and ISO/IEC JTC1/SC29/WG11, 10th Meeting, San Diego, CA, US, Apr. 2018, pp. 1-10.
Kim et al., "A Fast Fractional-Pel Motion Estimation using 4-Tap Chroma Interpolation Filter for HEVC Encoder," Advanced Science and Technology Letters, vol. 146 (FGCN 2017), 2017, pp. 23-29.
Lv et al., "A Resolution-adaptive Interpolation Filter for Video Codec," 2014 IEEE International Symposium on Circuits and Systems (ISCAS), Melbourne, AU, 2014, pp. 542-545.
Moghe et al., "Performance Analysis of N-tap Interpolation Filter in H.265/HEVC (High Efficiency Video Coding)," International Journal of Computer Science and Network, vol. 5(6), Dec. 2016, pp. 869-872.
Nielsen Holdings PLC, "The Nielsen Total Audience Report," Nielsen Holdings, New York, NY, US, 2018, 32 pages.
Sullivan, "Color format downconversion for test sequence generation," Document JVT-I018, JVT of ISO/IEC MPEG & ITU-T VCEG, 9th Meeting, San Diego, CA, US, Sep. 2003, pp. 1-10.
Ugur et al., "Motion Compensated Prediction and Interpolation Filter Design in H.265/HEVC," IEEE Journal of Selected Topics in Signal Processing, vol. 7(6), Dec. 2013, pp. 946-956.
Wedi, "Adaptive Interpolation Filter for Motion Compensated Prediction," Proceedings IEEE International Conference on Image Processing, Rochester, NY, US, IEEE, Sep. 2002, pp. II-509-II-512.
Wedi et al., "Motion- and Aliasing-Compensated Prediction for Hybrid Video Coding," IEEE Transactions on Circuits and Systems for Video Technology, vol. 13(7), Jul. 2003, pp. 577-586.
Wedi, "Adaptive Interpolation Filters and High-Resolution Displacements for Video Coding," IEEE Transactions on Circuits and Systems for Video Technology, vol. 16(4), Apr. 2006, pp. 484-491.
Woods, "Improved MC-EZBC with Quarter-pixel Motion Vectors," 60 MPEG Meeting; May 6-10, 2002, Fairfax, VA, US, Motion Picture Expert Group ISO/IEC JTC1/SC29/WG11, No. M8366, May 1, 2002, 16 pages.
Yan et al., "A Convolutional Neural Network Approach for Half-Pel Interpolation in Video Coding," 2017 IEEE International Symposium on Circuits and Systems (ISCAS), Baltimore, MD, US, 2017, 4 pages.
Yoo et al., "Video resampling algorithm for simultaneous deinterlacing and image upscaling with reduced jagged edge artifacts", EURASIP Journal on Advances in Signal Processing, 2013 (1):188, Dec. 1, 2013, Springer, New York, NY, US, 24 pages.
Search Report issued in related application EP 19305208.1, dated Jul. 10, 2019, 11 pages.

* cited by examiner

METHOD FOR IMAGE ENCODING AND APPARATUS FOR IMPLEMENTING THE SAME USING INTERPOLATION FILTER BASED ON MOTION SPEED

CROSS-REFERENCE TO RELATED APPLICATIONS

This application claims priority benefit under 35 U.S.C. § 119(d) from European Patent Application No. 19 305 208.1, filed Feb. 21, 2019, the disclosure of which is incorporated by reference herein in its entirety.

FIELD

The present disclosure relates to the field of image processing, in particular for video stream compression/decompression.

BACKGROUND

Video data is often source encoded so as to decrease the amount of resources necessary for its transmission and/or storage in memory. Various video coding or compression standards that have been developed over the recent years, such as H.264/AVC, H.265/HEVC or MPEG-2, may be used for that purpose.

In known video coding or compression schemes, images (also referred to as "frames") of an input video stream to be encoded are typically processed according to an image encoding sequence, and each image is divided into pixel sets (also referred to as, depending on the scheme, "blocks" or "coding unit") which are also processed sequentially, for example starting from the set located in the upper left corner of the image, and ending with the set located in the lower right corner of the image.

The encoding of an image of an input video stream may therefore involve dividing a pixel matrix corresponding to the image into several pixel sets, for example into blocks of a fixed size (16×16 pixels, 32×32 pixels, or 64×64 pixels), and encoding these pixel blocks according to a predefined encoding sequence. In some standards, such as H.264/AVC, blocks smaller than 16×16 pixels may be defined (for example of size 8×8 pixels or 4×4 pixels) so as to perform encoding of the image with a finer granularity.

Conventional video compression schemes can be classified into two main categories: an intra prediction video coding category on the one hand, and an inter prediction video coding category on the other hand. In intra prediction video coding, the compression processing uses pixels of a unique image or video frame, while in inter prediction video coding, the compression processing uses pixels of several images or video frames for which prediction encoding has already been performed. More specifically, in intra prediction video coding, the processing of a pixel block (or set of pixels) typically includes a prediction of the pixels of the block based on previously encoded pixels (also called "causal pixels") in the image currently being encoded (which may be referred to as "current image"). In inter prediction video coding, the processing of a pixel block typically includes a prediction of the pixels of the block based on pixels of one or more previously encoded images.

Exploiting the spatial redundancies (for intra prediction video coding) and/or temporal redundancies (for inter prediction video coding) is therefore performed to avoid transmitting or storing the pixel values of each pixel block (or set of pixels), and at least some of the blocks of each encoded image in a video stream is represented by a pixel residual that corresponds to the difference (or the distance) between prediction values and true values for the pixels of the predicted block. Information related to pixel residual is inserted in the encoded data generated by a video encoder after transform and quantization (e.g. Discrete Cosinus Transform, DCT) so as to reduce the entropy of data generated by the encoder.

In 2013, the video compression standard High Efficiency Video Coding (HEVC)/H.265 reached FIDS status. This standard was developed by the Joint Collaborative Team on Video Coding (JCT-VC), a collaboration between two standardization bodies ISO/IEC MPEG and ITU-T VCEG. HEVC is the successor of the H.264/AVC (Advance Video Coding) standard, which is widely used nowadays (around 90% videos are still coded with AVC). HEVC brings improvements compared to AVC, offering double the data compression ratio at the same level of video quality, or substantially improved video quality at the same bit rate.

The visualization of video content has been revolutionized in the last few years with the emergence of video-on-demand services like YouTube, Netflix, Hulu, etc. web-TV, video-sharing sites, social networks like Facebook, Instagram, Snapchat etc., or live video streaming service for individuals. All of the above-mentioned services are rapidly increasing of internet video traffic. In addition, video data is getting larger and there is a constant need to compress it, but without significantly degrading the quality of the video. Research predicts that by the year 2021, the video traffic will increase by 4 times since 2016 and the amount of data will probably represent around 81% of all internet traffic. New technologies like 360° videos, Virtual Reality, HD videos, UHD videos, 4K, 8K or 16K videos yield significantly more data to transmit.

As a result, a Joint Video Experts Team (JVET)—a collaborative team formed by the same standardization bodies MPEG and VCEG—has been created with an aim to develop a new video coding standard to be known as Versatile Video Coding—VVC/H.266. The primary objective of this new codec is to provide a significant improvement in compression performance over HEVC. The VVC standard is scheduled to be released in 2021 and by then, the aim is not just to lower the bitrate at the same video quality, but also to develop a codec which would aid the deployment of higher quality video services and emerging applications such as 360° omnidirectional immersive multimedia and High Dynamic Range (HDR) video.

Motion compensated prediction (MCP) is a technique used by video coders to reduce the amount of information transmitted to a decoder by exploiting the temporal redundancy present in the video signal. By utilizing fractional accuracy for motion vectors instead of integer accuracy, the residual compression error is decreased and coding efficiency is increased. The use of motion vectors having fractional values requires the interpolation of integer pixel values in reference frames For this reason, interpolation filters have been used in recent video coding standards, such as H.264/AVC, H.265/HEVC or MPEG-2.

The main role of the interpolation filter is to help predict the accurate values of pixels, if the motion does not correspond to exactly integer-pel precision. Since the H.264/AVC standard, the quarter-pel precision has been used for motion vectors, which has significantly improved the accuracy of the motion compensated prediction.

The interpolation filter in the HEVC standard is a DCT-based interpolation filter (DCT-IF). The VVC standard, in its current standardization stage, merely inherits the DCT-IF interpolation filter from HEVC.

There is therefore a need for providing an improved video processing scheme and video encoder and/or decoder implementing the same that address at least some of the above-described drawbacks and shortcomings of the conventional technology in the art.

It is an object of the present subject disclosure to provide an improved video processing scheme and apparatus implementing the same.

Another object of the present subject disclosure is to provide an improved video encoding or compression and/or video decoding or decompression scheme and apparatuses implementing the same.

Another object of the present subject disclosure is to provide an improved video encoding and/or decoding scheme and apparatuses implementing the same for alleviating the above-described drawbacks and shortcomings of conventional prediction-based video encoding/decoding schemes, in particular video encoding/decoding schemes using interpolation to improve motion compensation prediction.

SUMMARY

To achieve these objects and other advantages and in accordance with the purpose of the present subject disclosure, as embodied and broadly described herein, in one aspect of the present subject disclosure, a method of encoding a first image in a plurality of images of input video data, wherein the first image is divided into a plurality of pixel blocks, is proposed, which comprises, for a current block of the first image: determining a motion speed for the current block with respect to a reference block correlated to the current block in a second image of the plurality of images, wherein the second image is distinct from the first image and was previously encoded according to an image encoding sequence for encoding the images of the plurality of images; determining an interpolation filter based on the motion speed; and using the interpolation filter for calculating fractional pixel values in the second image for a temporal prediction of pixels of the current block based on the reference block of the second image.

The present subject disclosure introduces the concept of motion adaptive interpolation, and provides several motion adaptive interpolation filter (MAIF) designs corresponding to different embodiments thereof.

The proposed MAIF scheme advantageously provides an improved interpolation to be used for inter prediction coding of video data by taking into account a motion speed of a block being encoded in the determination of the interpolation filter used for calculating fractional pixel values. Such improvement in the interpolation results in improved prediction According to the present subject disclosure, the interpolation used for calculating fractional pixel values for inter prediction coding of video data may be adapted dynamically based on an on-the-fly calculation of motion speed in some embodiments. In other embodiments, interpolation filter parameters (such as, for example, interpolation filter taps) may be pre-calculated for corresponding motion speed values, and stored in memory, for example as a Look-Up Table containing data related to interpolation filters and respectively corresponding motion speed values.

In addition, the present subject disclosure introduces new interpolation filter designs for inter prediction coding of video data, which advantageously simulate the behavior of a video camera when catching the motion of objects in a scene during an exposure time. The proposed interpolation filter designs are advantageously adaptive to motion speed, resulting in an inter prediction that is blurrier for high motion speeds (fast motions), and sharper for low motion speeds (slow motions).

In some embodiments, the proposed method further comprises: determining a motion vector for the current block, the motion vector pointing to the reference block in the second image, determining the motion speed based on the motion vector. Hence, a motion speed value may advantageously be determined based on a motion vector determined for the current block. in particular, depending on the embodiment, the motion speed may be determined based on a norm of the motion vector, based on a temporal distance between the first and second images in the input video data, and/or based on an absolute value of the component of the motion vector in a direction of interpolation.

In some embodiments, the interpolation filter may be determined as a low pass filter in the frequency domain, with a cutoff frequency that is based on the motion speed.

In some embodiments, the interpolation filter may be determined by obtaining its transfer function as a product of a cardinal sine function, and a window function, wherein the argument of the cardinal sine function depends on the motion speed (m).

For example, in some embodiments, the interpolation filter transfer function g(i) may be obtained as:

$$g(i) = \mathrm{sinc}\left(\frac{\pi(i+p)}{D(m)}\right) \cdot w(i+p)$$

In some embodiments, the interpolation filter may be determined by obtaining its transfer function as a product of a cardinal sine function convolved in the time domain with a rectangular window function, and a window function, wherein the width of the rectangular window function depends on the motion speed (m).

For example, in some embodiments, the interpolation filter transfer function g(i) may be obtained as:

$$g(i) = \left(\mathrm{sinc}\left(\frac{\pi(i+p)}{D}\right) * rect_m(i)\right) \cdot w(i+p)$$

In other embodiments, the interpolation filter transfer function g(i) may be obtained as:

$$g(i) = \left(\mathrm{sinc}\left(\frac{\pi(i+p)}{D(m)}\right) * rect_m(i)\right) \cdot w(i+p)$$

In some embodiments, the parameter D(m) may be obtained as:

$$D(m) = j + k^* \mathrm{abs}(\vec{mv})$$

where $\mathrm{abs}(\vec{mv})$ is based on an absolute value of the component of the motion vector in a direction of interpolation, and where j and k are positive real numbers.

In some embodiments, the width ($w_{rect}$) of the rectangular window may be chosen proportional to a value (noted $\mathrm{abs}(\vec{mv})$ herein) which is based on an absolute value of the component of the motion vector in a direction of interpolation.

For example, a width ($w_{rect}$) of the rectangular window may in some embodiments be obtained as: $w_{rect}=abs(\vec{mv})*l$, where $abs(\vec{mv})$ is based on an absolute value of the component of the motion vector in a direction of interpolation, and the coefficient l is a real positive number.

In one or more embodiments, the transfer function of the interpolation filter may be chosen to be a function of the motion speed.

According to another aspect of the present subject disclosure, a method of encoding a first image in a plurality of images of input video data, wherein the first image is divided into a plurality of pixel blocks which are encoded according to a block encoding sequence is proposed. The method comprises, for a current block of the first image: determining, via a processor of an image encoding system, a motion speed for the current block with respect to a reference block correlated to the current block in a second image of the plurality of images, wherein the second image is distinct from the first image and was previously encoded according to an image encoding sequence for encoding the images of the plurality of images; determining, via the processor, an interpolation filter based on the motion speed; and using, via the processor, the interpolation filter for calculating fractional pixel values in the second image for a temporal prediction of pixels of the current block based on the reference block of the second image.

According to yet another aspect of the present subject disclosure, a method of encoding a first image in a plurality of images of input video data, wherein the first image is divided into a plurality of pixel blocks, is proposed. The method comprises, for a current block of the first image: determining an interpolation filter based on a motion speed for the current block with respect to a reference block correlated to the current block in a second image of the plurality of images, wherein the second image is distinct from the first image and was previously encoded according to an image encoding sequence for encoding the images of the plurality of images; and using the interpolation filter for calculating fractional pixel values in the second image for a temporal prediction of pixels of the current block based on the reference block of the second image.

According to yet another aspect of the present subject disclosure, a method of encoding a first image in a plurality of images of input video data, wherein the first image is divided into a plurality of pixel blocks is proposed. The method comprises: calculating fractional pixel values in a second image of the plurality of images by multiplying a plurality of integer pixel values of the second image by interpolation filter coefficients, wherein the interpolation filter coefficients are determined based on a motion speed of a current block of the first image with respect to a reference block correlated to the current block in the second image, wherein the second image is distinct from the first image and was previously encoded according to an image encoding sequence for encoding the images of the plurality of images.

In some embodiments, the interpolation filter coefficients may be determined based on a motion vector for the current block, the motion vector pointing to the reference block in the second image.

In another aspect of the present subject disclosure, an apparatus is proposed, which comprises a processor, and a memory operatively coupled to the processor, wherein the apparatus is configured to perform a method as proposed in the present subject disclosure.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed. In another aspect of the present subject disclosure, a data set representing, for example through compression or encoding, a computer program as proposed herein, is proposed.

It should be appreciated that the disclosed embodiments can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which.

DETAILED DESCRIPTION

Figure 1A:
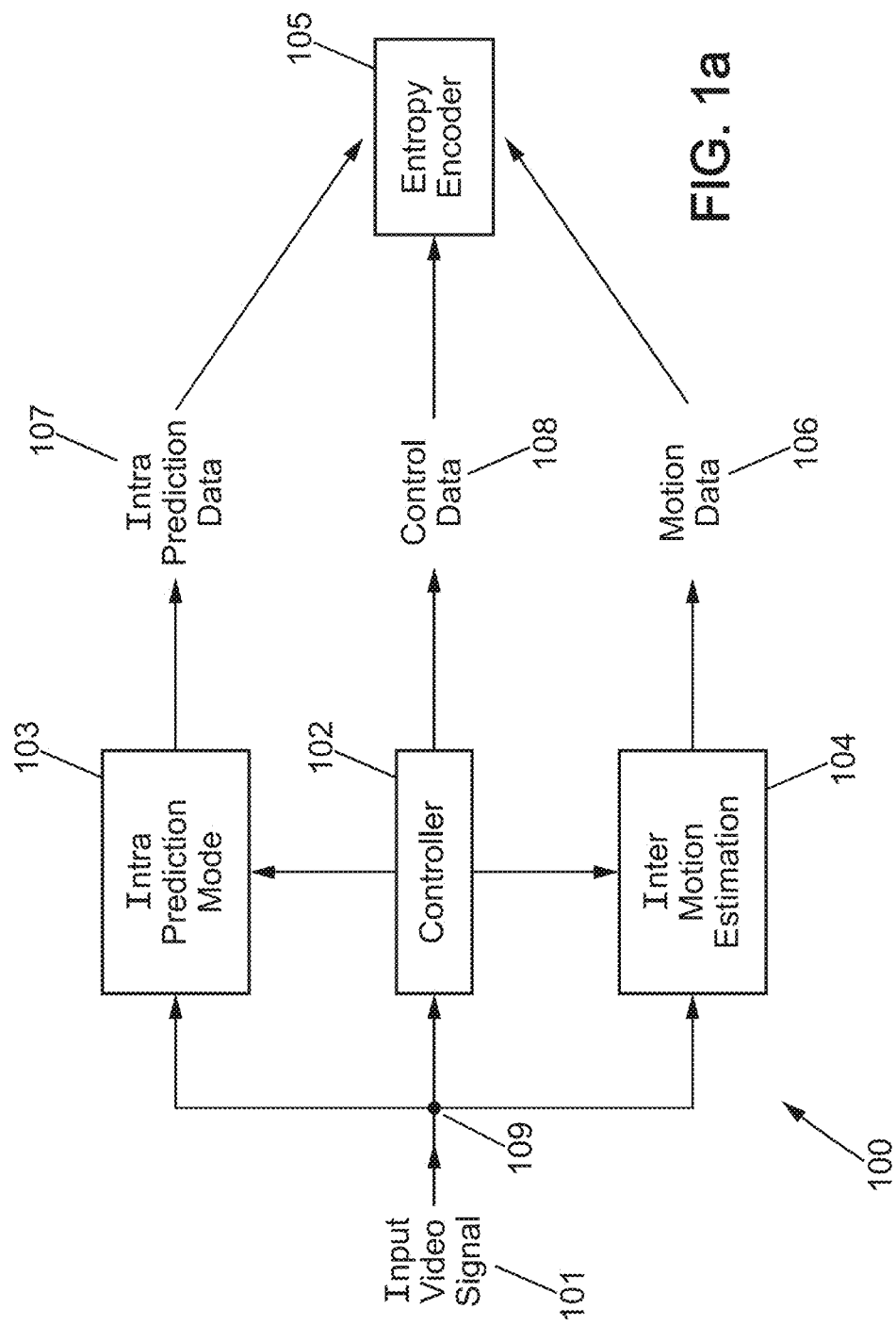
FIG. 1(a) is a block diagram illustrating an exemplary video encoder on which the proposed method may be implemented in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments. Additionally, elements in the drawing figures are not necessarily drawn to scale. For example, the dimensions of some of the elements in the figures may be exaggerated relative to other elements to help improve understanding of the disclosed embodiments. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms «memory» and «computer storage media» include any type of data storage device, such as, without limitation, a hard drive, a flash drive or other flash memory devices (e.g. memory keys, memory sticks, key drive), CD-ROM or other optical storage, DVD, magnetic disk storage or other magnetic storage devices, memory chip(s), Random Access Memory (RAM), Read-Only-Memory (ROM), Electrically-erasable programmable read-only memory (EEPROM), smart cards, or any other suitable medium that can be used to carry or store program code in the form of instructions or data structures which can be read by a computer processor, or a combination thereof. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Python, Visual Basic, SQL, PHP, and JAVA.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs.

In the following description and claims, the terms "coupled" and "connected", along with their derivatives, may be indifferently used to indicate that two or more elements are in direct physical or electrical contact with each other, or two or more elements are not in direct contact with each other, but yet still co-operate or interact with each other.

The proposed process may be implemented by any video encoder, video decoder, or video codec configured for encoding and/or decoding images (or frames) of input video data using predictive coding exploiting temporal redundancies of pixel blocks in images of the input video data (e.g. inter prediction video coding), such as, for example a video encoder and/or decoder compliant with the any of the H.261, MPEG-1 Part 2, H.262, MPEG-2 Part 2, H.264/AVC, H.265/HEVC, MPEG-4 Part 2 and SHVC (Scalable HEVC) standards.

Shown on FIG. 1(a) is a video encoder 100 that is configured to receive at input 109 an input video stream 101 that includes a plurality of images (or frames) to be processed for the encoding of the input video stream. The video encoder includes a controller 102, operatively coupled with the input interface 109, configured for controlling the operations of a motion estimation unit 110 and an inter prediction encoding unit 104, as well as an intra prediction encoding unit 103. Data received on the input interface 109 are transmitted to the motion estimation unit 110, to the inter prediction encoding unit 104, to the intra prediction encoding unit 103, and to the controller 102. Together with the controller 102, the motion estimation unit 110, the inter prediction encoding unit 104, and the intra prediction encoding unit 103 form an encoding unit 111 which is operatively coupled to the input interface 109.

The intra prediction encoding unit 103 is configured to generate intra prediction data 107 which are inputted to an entropy encoder 105. The motion estimation unit 110 is configured to generate motion data 106, which typically includes motion estimation data, which are provided to the controller 102 as well as to the inter prediction encoding unit 104 for inter prediction encoding. The inter prediction encoding unit 104 is configured to generate inter prediction data which are inputted to the entropy encoder 105. For example, in some embodiments, data provided to the decoder for an inter prediction encoding may include pixel residuals and information related to one or more motion vectors. Such information related to one or more motion vectors may include one or more indices that each identifies a prediction vector in a list of prediction vectors known to the decoder. Data provided to the decoder for a skip prediction mode may typically not include any pixel residual, and may also include one or more indices that each identifies a prediction vector in a list of prediction vectors known to the decoder. The list of prediction vector used for inter prediction encoding may not be identical to the list of prediction vectors used for skip prediction encoding.

The controller 102 is configured to generate control data which may also be provided as input data to the entropy encoder 105.

In one or more embodiments, an image undergoing processing is typically divided into blocks or coding units, the form and size of which may be determined based on the size of the pixel matrix that corresponds to the image, for example into square-shaped macroblocks of size 16×16 pixels. These blocks can form a set of blocks, corresponding to a partition of the image, for which a processing sequence may be defined that represents the order in which the blocks of the set are to be processed (e.g., encoded or compressed). In the exemplary case of square-shaped blocks of equal sizes, the processing sequence may define a processing order according to which the block located at the leftmost upper corner of the pixel matrix is processed first, followed by the block located immediately to the right of the previous block, until the block at the end of the upper line of blocks (that is, the block located at the rightmost upper corner of the pixel matrix) is processed, followed by the block located at the leftmost on the line immediately below the upper line of blocks, followed by the blocks of this second line processed from left to right, and so on until the block located at the rightmost lower corner of the pixel matrix, which is processed last.

One may therefore consider a so-called "current block," that is, a block being under processing in the current image. In some embodiments, the processing of the current block may include subdividing the current block into sub-blocks, so that the block may be processed with a finer spatial granularity. The processing of a block may also include a predicting of the pixels of the block, using spatial correlations (within the same image) or temporal correlations (in previously processed images) among pixels. In embodiments where a plurality of prediction type may be used, such as an intra prediction, an inter prediction, and/or a skip prediction, implemented in the encoder, the predicting of the block pixels typically include a selection of a prediction type, and the generating of prediction data that correspond to the selected prediction type, which may form, together with prediction type selection data, a set of encoding parameters.

In some embodiments, the prediction of the block under processing may comprise a calculation of pixel residuals, which respectively correspond to a gap, or distance, or difference, between pixels of the current block and corresponding pixels of a prediction block. The pixel residuals may be transmitted to the decoder in some embodiments after transform and quantization.

Different encoding modes may therefore be available for the encoding of a current block, so that encoding information 106-108 may be included in the data generated by the encoder further to the encoding of the current block. Such encoding information may for example comprise information on a coding mode (e.g. information indicating the type of prediction, among intra, inter, and skip, or among intra and inter) used for encoding the current block, information on the partitioning of the current block into sub-blocks, as the case may be, motion estimation information in the case of a prediction of the inter or skip type, and/or intra prediction mode information 107 in the case of a prediction of the intra type.

Interpolation for inter prediction video coding is described hereinafter in order to assist the understanding of the proposed method according to the present subject disclosure.

The coding of a current block of a first image in a set of images of input video data using motion compensated prediction typically involves determining a block (sometimes referred to as a "prediction block" or as a "reference block") in a second image of the set of images which has already been encoded (sometimes referred to as "reference image" or "reference frame"), which is correlated with the current block. Once a prediction block has been determined in the reference image, a motion vector representing the motion of the block between the first image and the reference image is determined, so that encoding information for the current block may comprise only information on the motion vector.

The pixel values of each block may correspond, depending on the block, to luma sample values, or to chroma sample values, which may be viewed as integer positions. For example, the H.264/MPEG-4 AVC video coding standard uses so-called "macroblocks", each macroblock comprising a 16×16 block of luma samples, and two corresponding 8×8 blocks of chroma samples for 4:2:0 color sampling.

In the following, aspects of the H.265/HEVC video coding standard useful for the understanding of the present subject disclosure are described.

Sampled representation of pictures: For representing color video signals, HEVC typically uses a tri-stimulus YCbCr color space with 4:2:0 sampling. This separates a color representation into three components called Y so-called luma component and Cb, and Cr called -chroma components. Each sample (also referred to as a pixel) for each component is typically represented with 8 or 10 bits of precision, and the 8-bit case is the more typical one. The video pictures are typically progressively sampled with rectangular picture sizes W×H, where W is the width and H is the height of the picture in terms of luma samples. Each chroma component array, with 4:2:0 sampling, is then W/2×H/2. Other color spaces are supported by HEVC such as, for example, color spaces with 4:2:2 sampling.

Division of the picture into Coding Tree Units: A picture is partitioned into CTUs (Coding Tree Units), each containing luma CTBs (Coding Tree Block) and chroma CTBs. A luma CTB covers a rectangular picture area of L×L samples of the luma component and the corresponding chroma CTBs cover each L/2×L/2 samples of each of the two chroma components with 4:2:0 sampling. The value of L may be equal to 16, 32, or 64 as determined by an encoded syntax element specified in the Sequence Parameter Set (SPS). HEVC supports variable-size CTBs selected according to the needs of encoders in terms of memory and computational requirements. The luma CTB and the two chroma CTBs together with the associated syntax form a CTU.

Division of the Coding Tree Block into Coding Blocks: The blocks specified as luma and chroma CTBs can be directly used as coding blocks (CBs) or can be further partitioned into multiple CBs. The partitioning is achieved using tree structures. The CTU contains a quadtree syntax that allows for splitting the CBs to a selected appropriate size based on the signal characteristics of the region that is covered by the CTB.

Figure 1B:
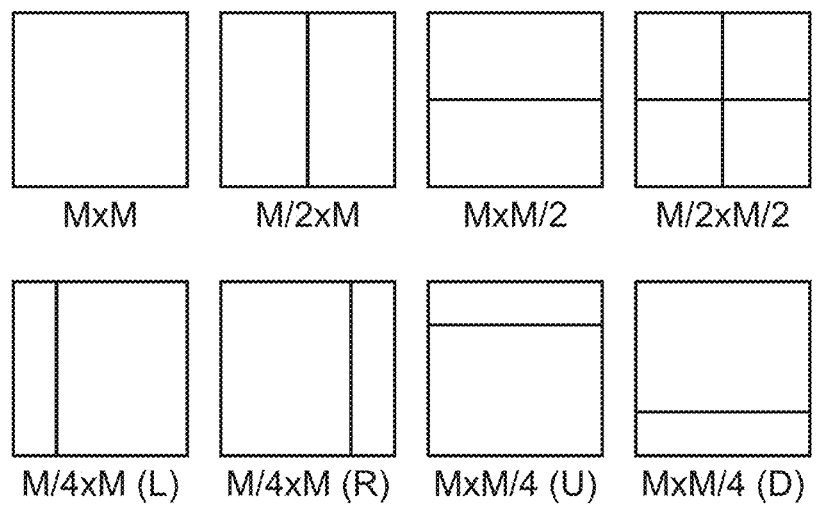
FIG. 1(b) illustrates different coding block splitting modes supported by the HEVC standard, which may be used in accordance with one or more embodiments.

Prediction Blocks and Units: The prediction mode for the CU (Coding Unit) is signaled as being intra or inter, according to whether it uses intra-picture (spatial) prediction or inter-picture (temporal) prediction. When the prediction mode is signaled as intra, the block size at which the intra prediction mode is established is the same as the CB size for all block sizes except for the smallest CB size that is allowed in the bitstream. When the prediction mode is signaled as inter, it is specified whether the luma and chroma CBs are split into one, two, or four PBs (Prediction Blocks), as shown in FIG. 1(b). FIG. 1(b) shows HEVC supported modes for splitting a CB into PBs in case of inter prediction. In the case of intra prediction, only M×M and M/2×M/2 (when M/2=4) are supported.

Figure 1C:
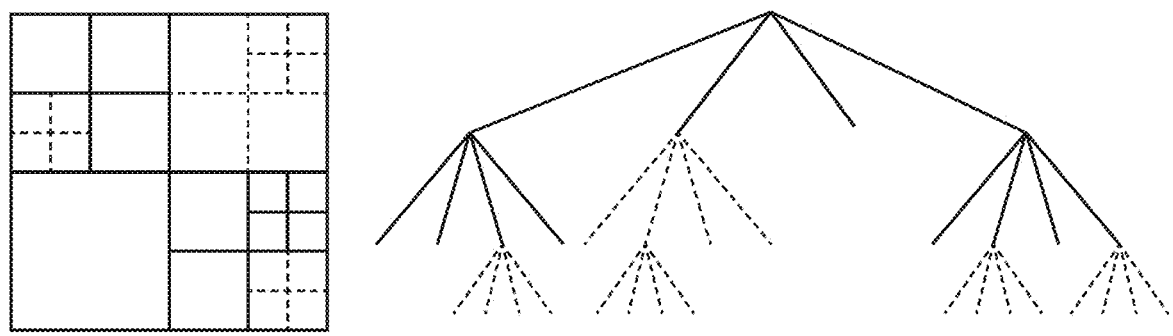
FIG. 1(c) illustrates a subdivision of an HEVC coding tree block into coding blocks and a corresponding quadtree, which may be used in accordance with one or more embodiments.

Tree-structured partitioning into Transform Blocks and Units: For residual coding, a CB can be recursively partitioned into Transform Blocks (TB). The largest possible TB size is equal to the CB size. The partitioning itself is signaled by a residual quadtree. Only square partitioning is specified, where a block can be recursively split into quadrants as illustrated in FIG. 1(c), which shows a subdivision of a CTB into CBs (and Transform Block (TBs). Solid lines indicate CB boundaries and dotted lines indicate TB boundaries. Shown on the left of FIG. 1(c) is a CTB with its partitioning, and on the right the corresponding quadtree. For a given luma CB of size M×M, a flag signals whether it is split into four blocks of size M/2×M/2. If further splitting is possible, as signaled by a maximum depth of the residual quadtree indicated in the SPS, each quadrant is assigned a flag that indicates whether it is split into four quadrants.

Intra-picture prediction: During the intra prediction process, current PUs are predicted using previously decoded boundary samples from adjacent PUs. 33 different angular directions are defined and supported for the PUs to cover more angles. Two other modes are implemented and can be used for the intra prediction: the Planar mode, assuming an amplitude surface with a horizontal and a vertical slope derived from the boundaries, and the DC mode for flat surfaces with a value matching the mean value of boundary.

Inter-picture prediction: Inter-coded blocks have more partition shapes than intra-coded ones as shown in FIG. 1(b). Asymmetric motion partitions are also supported in HEVC, as a CB can be split into two unequal-size blocks. HEVC supports motion vectors with units of one quarter of the distance between luma samples. For chroma samples, it is determined by the chroma sampling format. In the case of a 4:2:0 sampling format, the distance between chroma samples is in units of 1/8. Fractional sample interpolations are used to generate prediction samples for non-integer sampling positions. The fractional sample interpolation uses separable application of an 8-tap filter for the half sample positions and 7-tap filter for the quarter-sample positions. In HEVC, no intermediate rounding operations are computed, and longer filters have been adopted to improve precision and simplify the architecture of the process.

Transform, scaling, quantization and entropy coding: HEVC implements transforms for residual transform blocks in the same fashion than previous standards. The residual blocks obtained after the prediction are partitioned into multiple square TBs, possible block sizes are 4×4, 8×8, 16×16 and 32×32 squared pixels. The core transformation consists in applying two one-dimensional transforms in both horizontal and vertical directions. The elements of the core transform matrices have been derived by approximating scaled Discrete Cosine Transform (DCT) basis functions. An alternative integer transform is used to 4×4 luma residual blocks for intra prediction modes and it is derived from the Discrete Sine Transform (DST).

For quantization, the same uniform-reconstruction quantization scheme controlled by a quantization parameter as in H.264/AVC is used in HEVC. The range of QP values is defined from 0 to 51, and the quantization step sizes is increased by 6 doubles.

Whereas in H.264/AVC, two arithmetic coding algorithms were available and could be used, HEVC specifies only one arithmetic coding method which is the Context Adaptive Binary Arithmetic Coding (CABAC), the main algorithm remains unchanged.

In-Loop Filtering: Two processing steps intervene before writing the reconstructed samples in the picture decode buffer, the Deblocking Filter (DBF) and the Sample Adaptive Offset (SAO). The DBF is similar to the one introduced in H.264/AVC while the SAO is a newly introduced process. It is applied adaptively to all samples satisfying certain conditions based on gradient.

Figure 2A:
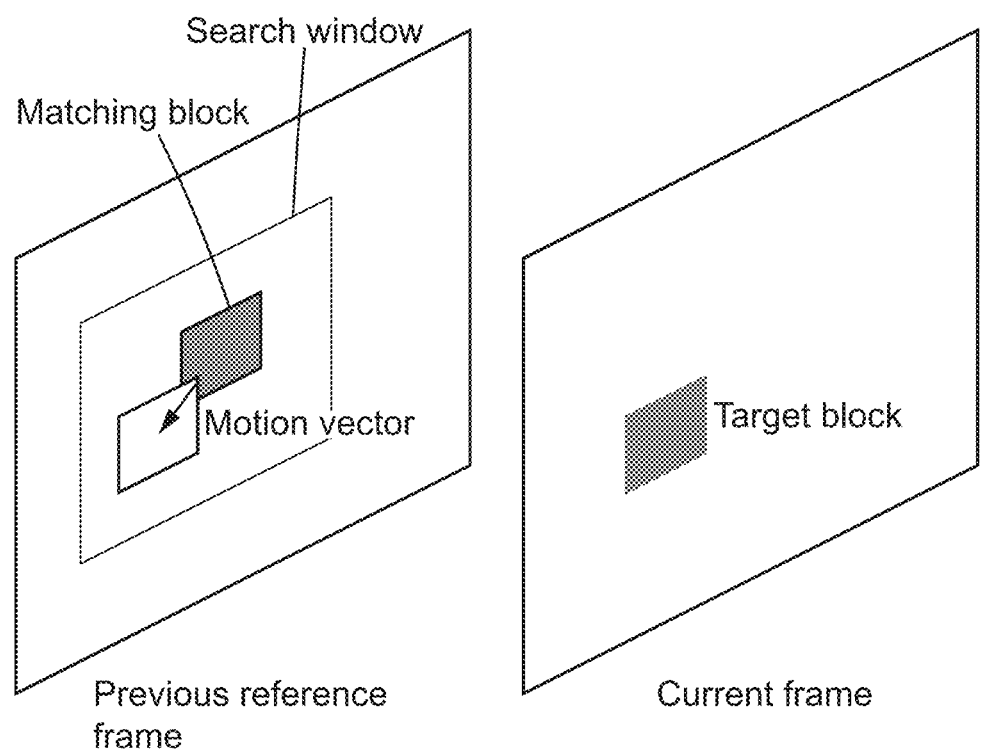
FIG. 2(a) illustrates motion compensation, which may be used in accordance with one or more embodiments.

Motion compensated prediction (MCP) is a technique used by video coders to reduce the amount of information transmitted to a decoder by exploiting the temporal redundancy present in the video signal. In MCP, the picture to be coded is first divided into blocks, and for each block, an encoder searches reference pictures to find a best matching block as shown in FIG. 2(a). The best matching block is called the prediction of the corresponding block and the difference between the original and the prediction signal is coded by various means, such as transform coding, and transmitted to a decoder. The relative position of the prediction with respect to the original block is called a motion vector and it is transmitted to the decoder along with the residual signal.

Figure 2B:
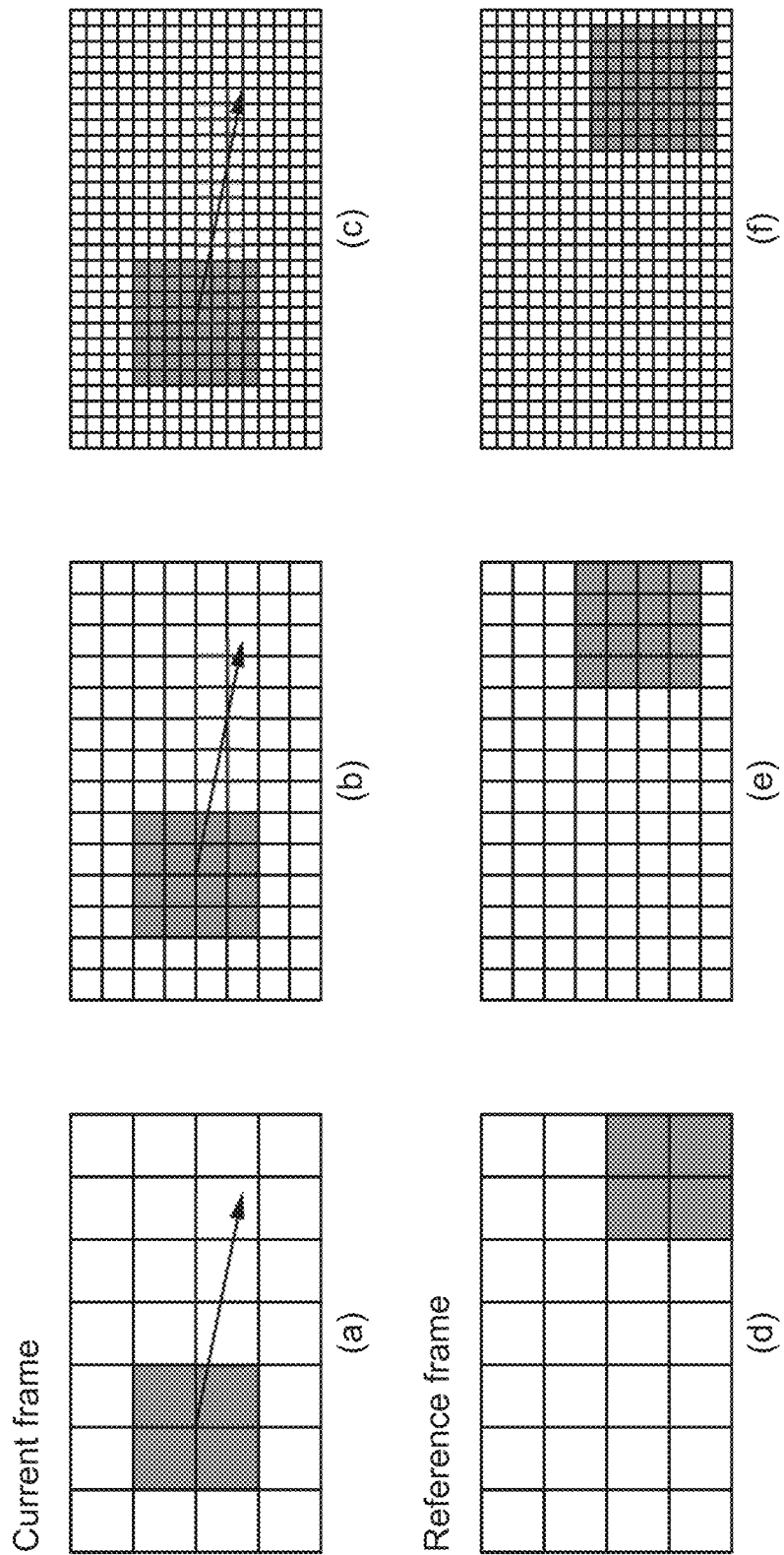
FIG. 2(b) illustrates using different pel precisions to improve the accuracy of motion compensated prediction, which may be used in accordance with one or more embodiments.

The true displacements of moving objects between pictures are continuous and do not follow the sampling grid of the digitized video sequence. This is illustrated in FIG. 2(b), which shows a current frame and a reference frame. The current frame is illustrated on the upper part of the figure with three pel precisions: integer-pel (FIG. 2(b)(a)), half-pel (2-pel) (FIG. 2(b)(b)), and quarter-pel (4-pel) (FIG. 2(b)(c)) precisions. The reference frame is illustrated on the lower part of the figure, also with three pel precisions: integer-pel (FIG. 2(b)(d)), half-pel (2-pel) (FIG. 2(b)(e)), and quarter-pel (4-pel) (FIG. 2(b)(f)) precisions. A motion vector points from a current 2×2 pixel blocks in the current frame to a position of a correlated prediction block in the reference frame. FIG. 2(b) shows that, for a given current block and motion vector, the prediction block pixels are determined with a better accuracy when using a 2-pel precision than when using integer precision, as well as when using a 4-pel precision than when using a 2-pel precision.

The precision of a motion vector can be represented in different accuracies. The 4-pel precision has been introduced in H.264/AVC and it is also used in HEVC. The 4-pel precision refers to using a quarter of the distance between pixels (or luma sample positions) as the motion vector precision for motion estimation and MCP. Hence, by utilizing fractional accuracy for motion vectors instead of integer accuracy, the residual error is decreased and coding efficiency of video coders is increased.

The samples of the PB for an inter-coded CB are obtained from those of a corresponding block region in the reference picture, which is at a position displaced by the horizontal and vertical components of the motion vector. Fractional sample interpolation may be used to generate the prediction for non-integer sampling positions. Interpolation filters are used to help predict the accurate values of pixels. Though higher precision motion vectors take more bits to encode, they can sometimes result in more efficient compression overall, by increasing the quality of the prediction signal.

The precision of the motion estimation may be improved by using fractional pixel values (also referred to as "fractional-pel" values) to achieve fractional-pel precisions, e.g. quarter-pel precision, half-pel precision, for the motion estimation, in particular for the accuracy of the motion vector. In order to reach fractional-pel values, that is, values at fractional positions in between two integer pixel values (or luma/chroma sample positions) in a reference image, integer pixel values are interpolated using an interpolation filter. Interpolation may be used for any type of pixel values, that is, for luma sample positions and/or chroma sample positions.

The number of integer pixel values involved in the interpolation process depends on the number of taps of the interpolation filter.

Pixel prediction based on motion estimation can therefore be improved by reaching fractional-pel values pointed to by a motion vector having fractional accuracy.

The interpolation filter specified in H.264/AVC uses various combinations of separable one-dimensional filters according to the fractional sample position. The main features of the interpolation filter used in the AVC standard are: 6-taps interpolation filter for obtaining luma samples at half-pel positions, cascade averaging for obtaining luma samples at quarter-pel positions, and bilinear interpolation for chroma samples.

In HEVC there is only one interpolation filter for luma samples and one interpolation filter for chroma samples, for each fractional position. The design used is based on a simplified form of the DCT-IF (Discrete Cosine Transformation—Interpolation Filter). The main features of DCT-IF interpolation filter used in H.265/HEVC standard are: symmetric 8-taps filter for luma samples at half-pel positions, asymmetric 7-taps filter for luma samples at quarter-pel positions, 4-taps filter for chroma samples.

In all previous video coding standards, the interpolation process for inter predicted frames has been static, meaning all the coefficients are the same and are independent from the content of the frames, that is, the images of input video data.

Filter coefficients for chroma and luma samples in HEVC are shown in Table 1 and Table 2, respectively.

TABLE 1

Luma interpolation filter coefficients for DCTIF

| Frac | Coefficients |
| --- | --- |
| 0 | {0, 0, 0, 64, 0, 0, 0, 0} |
| 1 | {−1, 4, −10, 58, 18, −5, 1} |
| 2 | {−1, 4, −11, 40, 40, −11, 4, −1} |
| 3 | {1, −5, 18, 58, −10, 4, −1} |

TABLE 2

Chroma interpolation filter coefficients for DCTIF

| Frac | Coefficients |
| --- | --- |
| 0 | {0, 64, 0, 0} |
| 1 | {−2, 58, 10, −2} |
| 2 | {−4, 54, 16, −2} |
| 3 | {−6, 46, 28, −4} |
| 4 | {−4, 36, 36, −4} |
| 5 | {−4, 28, 46, −6} |
| 6 | {−2, 16, 54, −4} |
| 7 | {−2, 10, 58, −2} |

Although DCT-IF is efficient, it is not adapted to objects whose speed vary, since it cannot compensate variations in the amount of motion-related blurriness incurred by a camera capture. Furthermore, DCT-IF tries to maximize accuracy, but this may not be a wanted characteristic when interpolating fast-moving objects.

Figure 3A:
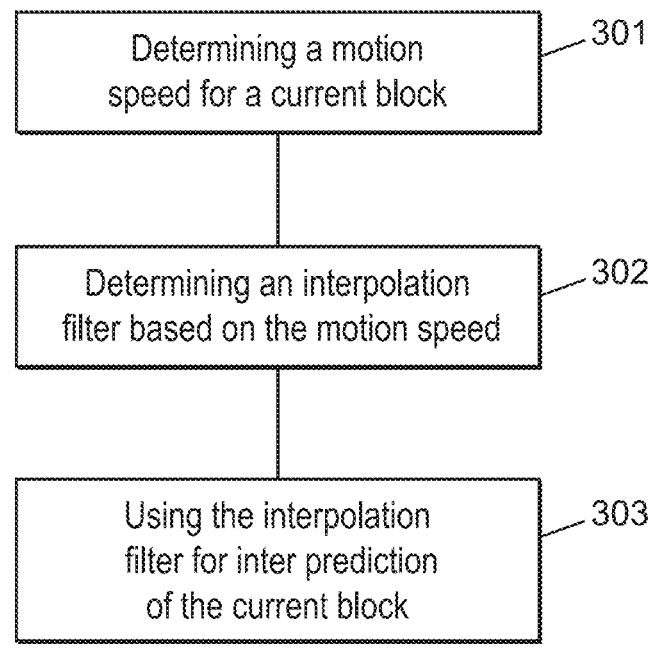
FIG. 3(a) is a block diagram illustrating an exemplary video processing method in accordance with one or more embodiments.

FIG. 3 is a block schematic diagram of a method of encoding a first image in a plurality of images of input video data according to embodiments of the present subject disclosure.

In some embodiments, the first image may be divided into a plurality of pixel blocks as discussed above, which may or may not be of equal size or of same shape, for purposes of encoding the image through encoding of the blocks, possibly according to a block encoding sequence. The block encoding sequence for processing, at the encoder or at the decoder, the blocks of the first image may define a sequence according to which blocks are encoded one after another. Because the blocks of the first image may be encoded at the encoder according to a predetermined processing sequence, the encoded blocks may be decoded at the decoder according to the same processing sequence. For example, a raster scan sequence may scan the blocks of the image starting from the block located at the leftmost upper corner of the first image (represented by a pixel matrix), and progress to the block adjacent to the previously scanned block located to the right of such.

The pixel blocks of the image may each be any set of pixels of the image, and may be chosen so that the set of blocks forms a partition of the image, that is, each pixel of the image belongs to only one blocks, and there is a one-to-one correspondence between each pixel of the image and a pixel of at least one block.

The pixel values of each block may correspond, depending on the block, to luma sample values, or to chroma sample values. For example, the H.264/MPEG-4 AVC video coding standard uses so-called "macroblocks", each macroblock comprising a 16×16 block of luma samples, and two corresponding 8×8 blocks of chroma samples for 4:2:0 color sampling.

The encoding of a current block of the first image using inter prediction encoding typically involves, as discussed above, a reference image in the plurality of images, which reference image was previously encoded according to an image encoding sequence for encoding the images of the plurality of images.

In one or more embodiments, a motion speed may be determined (301) for the current block, with respect to a reference block correlated to the current block in the reference image of the plurality of images. The motion of the current block may be determined using conventional motion estimation techniques, which will typically determine one or more reference images which contain prediction blocks that are correlated with the current block.

An interpolation filter may be then determined (302) based on the motion speed determined for the current block. Details of interpolation filter designs that takes into account a motion speed calculated for a current block are provided hereinafter.

The interpolation filter adapted to the motion speed may then be used (303) for calculating fractional pixel values in the reference image as part of a temporal prediction of pixels of the current block based on the prediction block of the reference image, for example as part of a motion estimation of the current block with respect to the prediction block of the reference image.

In one or more embodiments, different filter coefficients may be derived for each block of an image to be processed for motion interpolation in inter-picture prediction of the block.

Motion Adaptive Interpolation Filter (MAIF) as provided in the present subject disclosure advantageously gives the ability to improve the interpolation process from static (the same for all motion) to dynamic, hence adapting the interpolation to the speed of the motion in the video. The proposed process (that may be referred to as the MAIF technique) advantageously allows the interpolation to be different for slow motion and high-speed motion, therefore it allows the inter prediction to be blurrier when there are large motions and sharper when there is slow motion. This feature addresses among other the problem related to a camera not being able to catch the motion of high-speed objects in a given exposure time. The proposed process is indeed beneficial in that it addresses potential limitations of the video capture device that make such device blur out moving objects. Therefore the proposed process advantageously introduces an adaptive interpolation based on a motion estimation performed on an image of a video.

Figure 3B:
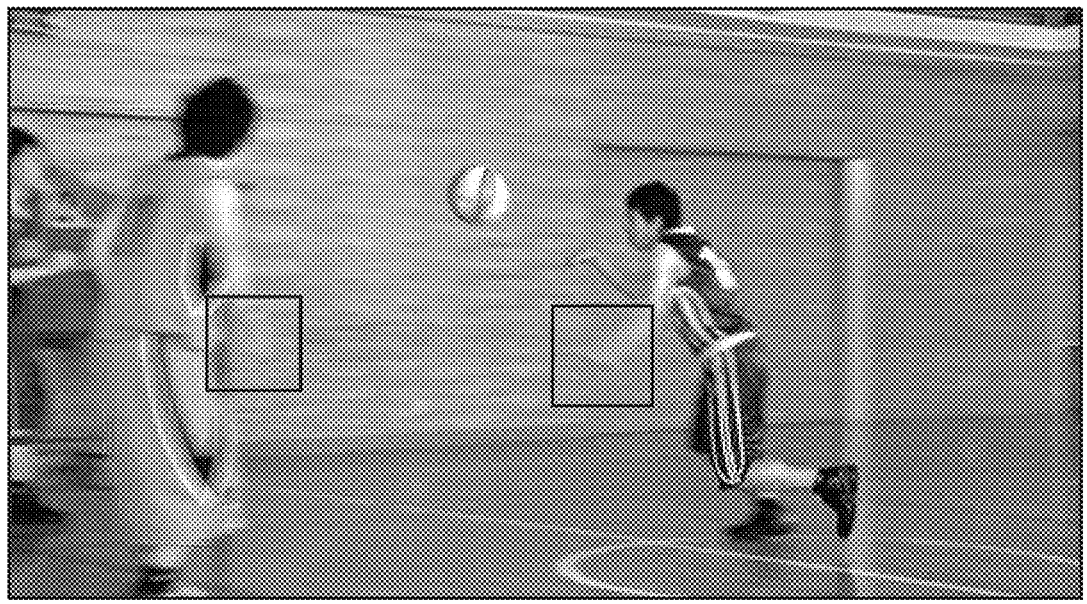
FIG. 3(b) is a picture that illustrates high motion in a video sequence on which the proposed method may be implemented in accordance with one or more embodiments.

FIG. 3(b) illustrates an example of high motion in a video sequence "BasketballPass". FIG. 3(b) shows a scene captured by a camera, in which the hands of basketball players moving in high speed are blurry due to the camera not being capable to correctly catch all the details.

In some embodiments, the determination of a motion speed value m for the current block may be based on a motion vector calculated for the current block, typically as part of a motion compensation process performed for the current block. A motion vector may then be determined for the current block, and the motion speed may be determined based on the motion vector.

In some embodiments, the motion speed may be determined based on a norm of the motion vector. The norm of a motion vector $\vec{mv}$ of components $MV_1$ and $MV_2$ ($\vec{mv}=[MV_1, MV_2]$) may be calculated according to any suitable definition, for example as: $|\vec{mv}|_p=(\Sigma_{k=1}^{2}|MV_k|^p)^{1/p}$, where | | designates the absolute value, and p is a non-zero natural integer. For example, the quadratic norm (p=2) of the motion vector $\vec{MV}$ may be expressed as: $|\vec{mv}|_2=\sqrt{|MV_1|^2+|MV_2|^2}$.

In other embodiments, the motion speed may be determined based on an absolute value abs($\vec{mv}$) of the component of the motion vector in the direction of the interpolation (e.g. horizontal or vertical). For example, for a motion vector $\vec{mv}$ of components $MV_1$ and $MV_2$ ($\vec{mv}=[MV_1, MV_2]$), abs($\vec{mv}$) will correspond to $|MV_1|$ if interpolating in the horizontal direction, and to $|MV_2|$ if interpolating in the vertical direction.

In other embodiments, a motion speed value m for the current block may be determined based on a temporal distance between the first image and the reference image in the input video data.

For example, in some embodiments, the motion speed value m may be obtained directly from the norm of the motion vector: m=abs($\vec{mv}$), or m=scaling·abs($\vec{mv}$), where scaling is a scaling coefficient.

In other embodiments, the motion speed value may be obtained based on a norm of the motion vector, and a value representing or corresponding to a time difference $\Delta t$ between the current frame and the reference frame (or, depending on the embodiment, an estimate thereof):

$$m = \frac{\text{abs}(\vec{mv})}{\Delta t}, \text{ or } m = k \cdot \frac{\text{abs}(\vec{mv})}{\Delta t}.$$

Indeed it may be considered that using both of these parameters in the determination of a motion speed value provides a more accurate representation of the motion speed.

Embodiments of the proposed filter design are described below.

In one or more embodiments, the proposed interpolation filter may be a Kaiser-windowed Finite Impulse Response (FIR) filter with an adjustment of the bandwidth size based on the motion speed m determined for the current block.

For example, in some embodiments, a non-scaled filter impulse response g(i) of an interpolation filter according to the present subject disclosure is defined by the following formula, referred to herein as Equation 1:

$$g(i) = \left(\text{sinc}\left(\frac{\pi(i+p)}{D(m)}\right) * rect_m(i)\right) \cdot w(i+p)$$

where i is a discrete time value, * represents a discrete convolution operator, defined by the following formula for the convolution of two discrete valued functions f and g:

$$f(i)*g(i)=\Sigma_{m=-\infty}^{\infty}f(m)\cdot g(i-m),$$

and · is the regular multiplication.

Further, the symbols used in Equation 1 are defined as follows:

Sinc is the cardinal sine function, which may be defined as:

$$\text{sinc}(x) = \frac{\sin(x)}{x};$$

D(m) is a low-pass factor of the sinc function which depends on the motion speed value m;

p is a fractional phase offset, which indicates a fractional pixel position;

$rect_m(i)$ is a rectangular window function, with a width $w_{rect}(m)$ which also depends on m, designed to control motion blur by convoluting with the cardinal sine function. A suitable rectangular window function can be defined as follows:

$$rect_m(i) = \begin{cases} 1, & |i| \le w_{rect}(m) \\ 0, & \text{otherwise} \end{cases}$$

w is a windowing function that is symmetric around zero and has a zero value outside the range of plus or minus L (2*L being the number of taps of the filter) and nonzero within that range, except possibly at the extreme boundaries.

In signal processing, a filter having an impulse response using a cardinal sine function, usually known as a sinc filter, is typically used as a filter having an ideal response in that it removes all frequency components above a given cutoff frequency, without affecting lower frequencies, and with a linear phase response. The filter impulse response is a sinc function in the time domain, and its frequency response is a rectangular function. It is a so called "ideal" low-pass filter in the frequency domain, as it passes frequencies below a cutoff frequency, and also cuts frequencies above the cutoff frequency. As illustrated on FIG. 5(a) the zero crossing of the first lobe depends on the argument of the sinc function, which in the proposed design corresponding to Formula 1 advantageously depends on m because of D(m).

In one or more embodiments, a windowing function may advantageously be used in order to reduce the amplitude of frequency components that result from the use of discrete functions instead of continuous functions. Indeed, while the Fourier transform of a continuous cardinal sine function has a rectangular shape in the frequency domain with sharp frequency cut-off, the Fourier transform of a discrete cardinal sine function has a rectangular shape in the frequency domain with side lobes that correspond to noise with respect to the desired rectangular shape. A windowing function may then be used to attenuate such side lobes in the frequency domain.

Any suitable windowing function verifying the above criteria may be used in the design of the filter impulse response. For example, the Kaiser window function may advantageously be used, as it adequately attenuates side lobes in the frequency domain.

In some embodiments, D(m) may be obtained as:

$$D(m) = j + k \cdot m$$

where real coefficients j and k can take any positive real number, for example 0.9, 1, or 1.1, and 0.01, or 0.001 respectively.

As discussed above with respect to the motion speed value m, m may be obtained in some embodiments, based on $abs(\vec{mv})$, where the $abs(\vec{mv})$ value may be obtained based on an absolute value of the component of the motion vector in the direction of the interpolation (e.g., horizontal or vertical), for example as: $m = abs(\vec{mv})$.

That is, D(m) may be obtained in some embodiments as:

$$D(m) = j + k \cdot abs(\vec{mv})$$

where $abs(\vec{mv})$ is based on an absolute value of the component of the motion vector in the direction of the interpolation (e.g. horizontal or vertical), and j and k are two positive real numbers.

In other embodiments, m may be obtained as:

$$m = \frac{abs(\vec{mv})}{\Delta t},$$

so that D(m) may be obtained as:

$$D(m) = j + k \cdot \frac{abs(\vec{mv})}{\Delta t},$$

where $\Delta t$ is an estimate of the time difference between the current frame and the reference frame, $abs(\vec{mv})$ is based on an absolute value of the component of the motion vector in the direction of the interpolation (e.g. horizontal or vertical), and j and k are two positive real numbers.

In one or more embodiments, the non-scaled filter impulse response coefficients g(i) may be combined (e.g. summed) to obtain scaled values. For example, the coefficients g(i) may be summed in order to obtain the following scale value T:

$$T = \sum_{i=-L+1}^{L} g(i)$$

The floating-point filter impulse response may then be adjusted using the following formula to provide a DC gain equal to 1:

$$h(i) = \frac{g(i)}{T}$$

The set of h(i) coefficients represents the output of the interpolation filter determination, in that it contains the values of the filter coefficients to be used to interpolate the current block at fractional pixel position p.

Figure 4:
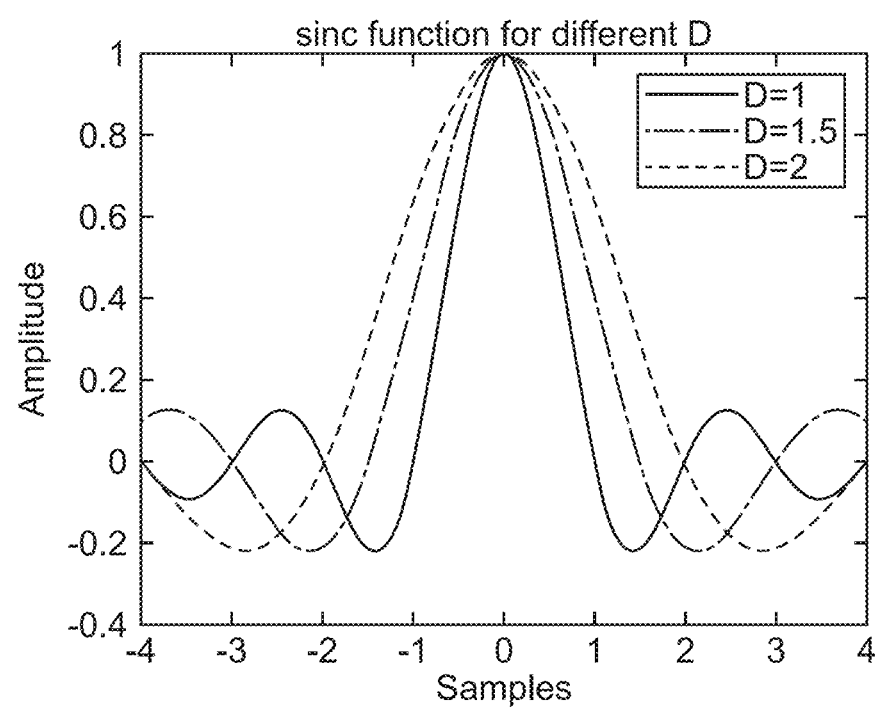
FIG. 4 is a plot diagram of a cardinal sine function in accordance with one or more embodiments.

FIG. 4 shows plots of the sinc function $$sinc\left(\frac{\pi(i+p)}{D}\right)$$

in the time domain for three different values of D (D=1, D=1,5, and D=2). Each argument i+p corresponds to an integer argument i ($i \in \{-4, -3, -2, -1, 0, 1, 2, 3, 4\}$) to which a fractional value p ($p \in \{0, 0.25, 0.5, 0.75\}$) is added. As the argument of the sinc function increases, the width of the first lobe decreases. Therefore, since the argument of sinc function used in the proposed interpolation filter is inversely proportional to D(m), the width of sinc increases as D(m) increases, and the width of sinc decreases as D(m) decreases, as shown in FIG. 4.

If D(m) is chosen in a way to vary in the same way as m (in other words, as m increases, D(m) increases and vice-versa), that means that for higher motion, the sinc filter will cut off higher frequencies and keep the smaller ones. In other words, it will act as a blurring filter, which is exactly what we want because fast moving objects appear blurry in the video.

A convolution with a rectangular window was introduced in Equation 1 in order to appropriately simulate the process of capturing the image (frame) by a camera. Indeed, the camera is not capable of capturing a single instant, so instead, what the camera actually does is integrate what it sees in a given period of time depending on shutter speed. It can be represented as a function:

$$F(x, y) = \int_0^{\Delta t} f(x, y, t) dt$$

where:

x, y represents a position of a pixel in an image;

F(x, y) represents the values of pixels after integration;

f(x, y, t) represents the integrable function of what the camera sees; and

Δt designates a period of time depending on the shutter speed.

When there is no motion in the scene captured by the camera, f(x, y, t) is approximately constant during the whole shutter time. However when there is motion in the scene captured by the camera, an integration for each value of a pixel is performed from the beginning of the shutter time until the end of the shutter time. The proposed interpolation filter of Formula 1 advantageously imitates this process via the convolution of the sinc function with a rectangular window.

Figure 5A:
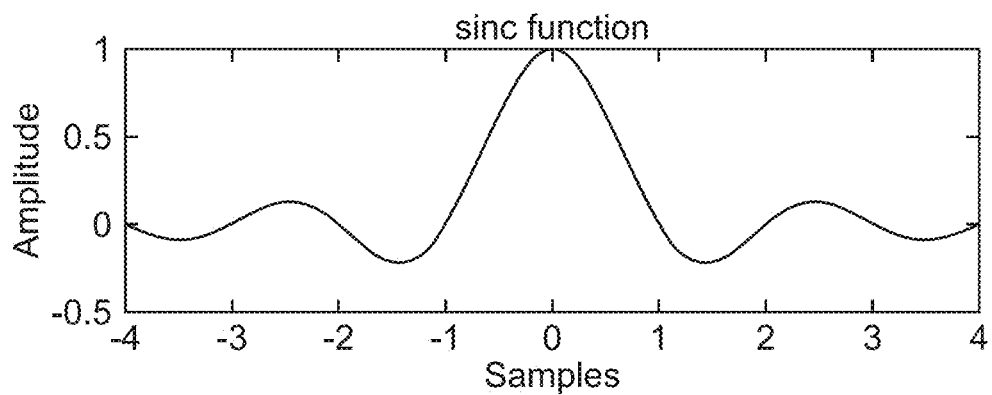
FIG. 5(a) is a plot diagram of a cardinal sine function in accordance with one or more embodiments.
Figure 5B:
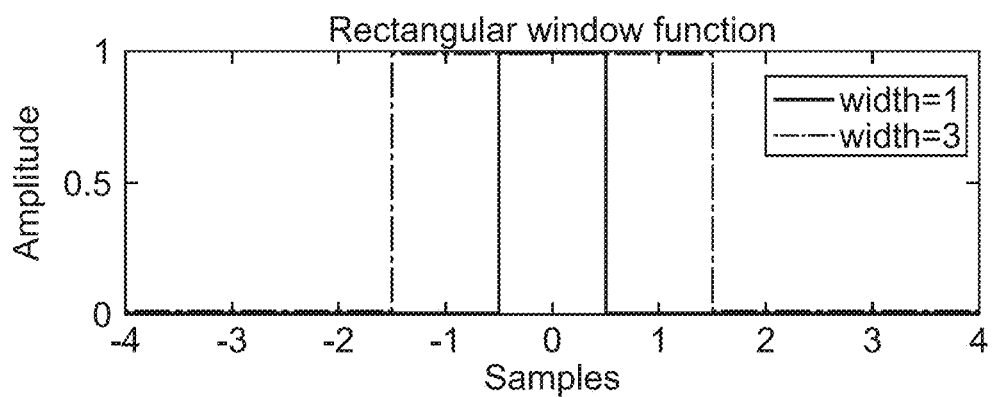
FIG. 5(b) is a plot diagram of rectangular window functions in accordance with one or more embodiments.
Figure 5C:
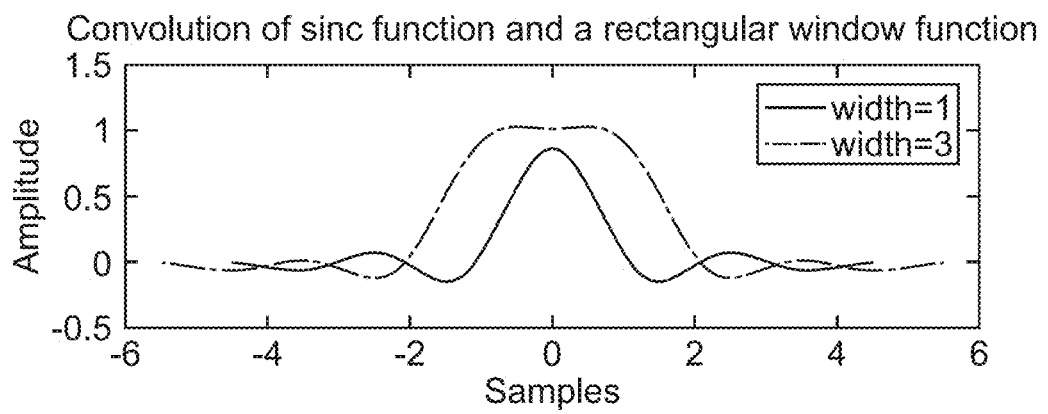
FIG. 5(c) is a plot diagram of convolutions of a cardinal sine function and a rectangular window function in accordance with one or more embodiments.

The effect of convoluting a sinc function with a rectangular window is illustrated on FIGS. 5(a), 5(b) and 5(c).

FIG. 5(a) shows the plot of a $$\text{sinc}\left(\frac{\pi(i + p)}{D}\right)$$

function, each argument i+p corresponding to an integer argument i (i∈{-4, -3, -2, -1, 0, 1, 2, 3, 4}) to which a fractional value p (p∈{0, 0.25, 0.5, 0.75}) is added.

FIG. 5(b) shows the plot of a rectangular window function in the time domain, with two different width values: width=1, and width=3. The rectangular function of width equal to 1 may be defined as follows:

$$rect(i) = \begin{cases} 1, & |i| \le 1.5 \\ 0, & \text{otherwise} \end{cases}$$

The rectangular function of width equal to 3 may be defined as follows:

$$rect(i) = \begin{cases} 1, & |i| \le 1.5 \\ 0, & \text{otherwise} \end{cases}$$

FIG. 5(c) shows respective plots of the convolution of the sinc function of FIG. 5(a) with the rectangular functions of FIG. 5(b), that is, the convolution of the sinc function with a rectangular window function for two different widths of the rectangular window function.

As can be seen on FIG. 5(c), when $w_{rect}$ is large (for example in the case where $w_{rect}$=3), the resulting filter cuts off higher frequencies and hence blurs out the prediction. As $w_{rect}$ gets smaller (for example in the case where $w_{rect}$=1), the filter sharpens the prediction. As a consequence, the width $w_{rect}$ of the rectangular window convolved with the sinc function may be chosen in one or more embodiments proportional to m, which advantageously provides a motion adaptive interpolation filter that blurs out/sharpens the prediction whenever appropriate, hence yielding coding gains because of a more efficient inter prediction.

The present subject disclosure provides different embodiments through which different filters are proposed, each with a transfer function dependent on a motion speed parameter, which may advantageously be used for interpolation during a temporal (e.g. inter) prediction of pixels. Depending on the embodiment, the general behavior of the proposed filters is configurable through the definition of parameters that depend on an estimated motion speed m, such as the D(m) and/or $w_{rect}$(m) parameters described herein.

In one or more embodiments, the proposed process further takes into account the GOP (Group of Pictures) structure used as encoding configuration. For example, generally sharper interpolation filters have shown better gains for RA (Random Access) configurations, but generally smoother interpolation filters have shown better results for LD (Low Delay) configurations. Therefore one interpolation filter definition might not be suitable for all configurations.

To address this problem, the proposed method may further comprise the signaling, on an image/frame level, information indicating which interpolation filter definition is used for all blocks of the current image/frame. The signaling also allows switching back to DCT-IF if needed, that is, switching back to use of the conventional HEVC interpolation filters. Indeed, DCT-IF is generally blurrier than the proposed method, even for high motion speeds. Therefore, for low delay applications, it may be advantageous to use a blurry filter in order to avoid propagation of prediction error artefacts.

In signal processing, a window function is a mathematical function that is zero-valued outside of some chosen interval. In typical applications, these functions are non-negative, smooth, "bell-shaped" curves. Some window functions, such as the Rectangular window, Triangular window, Parzen window, Blackman window, and Hamming window, are known in the field of signal processing.

The Kaiser window function is defined as:

$$w(x) = \begin{cases} \dfrac{I_0\left(\beta\sqrt{1 - \left(\frac{x}{L}\right)^2}\right)}{I_0(\beta)}, & |x| \le L \\ 0, & \text{otherwise} \end{cases}$$

where $I_0(x)$ represents the modified $0^{th}$ order Bessel function of the first kind, and β is a window shape tuning parameter that adjusts the trade-off between stop-band attenuation or pass-band ripple and transition bandwidth. This function can be computed using the approximation.

$$I_0(x) \cong 1 + \sum_{k=1}^{K} \left(\frac{(x/2)^k}{k!}\right)^2$$

Figure 6A:
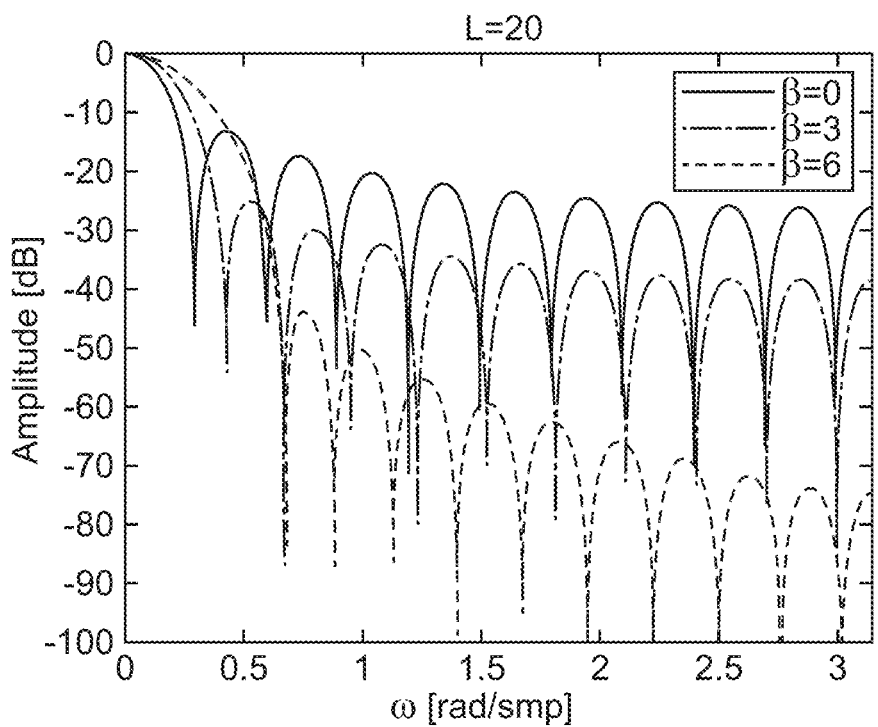
FIG. 6(a) is a plot diagram of respective impulse responses of Kaiser window functions in the time domain in accordance with one or more embodiments.

The Kaiser window may in some embodiments be preferred to other window functions because of its capability to adapt the number of lobes, the width, and the slope of the window on two coefficients:

The parameter β controls the slope of the window in the time domain, that is, it controls the trade-off between the main-lobe width and the side-lobe area in the frequency domain. As β increases, the main lobe increases in width, and the side lobes decrease in amplitude, as illustrated by FIG. 6(a), which shows the transfer function of a Kaiser window in the frequency domain for different values of β (β=0, β=3, and β=6).

Figure 6B:
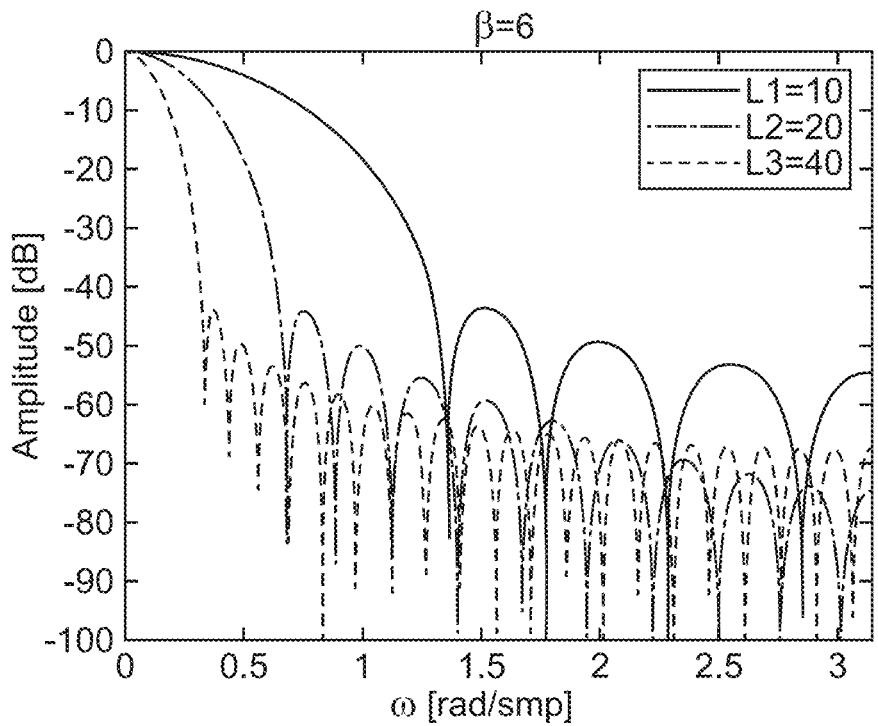
FIG. 6(b) is a plot diagram of respective impulse responses of Kaiser window functions in the frequency domain in accordance with one or more embodiments.

The parameter L represents the window duration in the time domain, and the impact of L on the transfer function in the frequency domain is that as L increases in time, the window gets narrower in frequency. This is illustrated by FIG. 6(b), which shows the transfer function of a Kaiser window in the frequency domain for different values of L (L=10, L=20, and L=40).

Different embodiments of the proposed method are described in the following through exemplary designs of an interpolation filter transfer function that can vary with the motion speed (m) of a current block being processed (e.g. encoded and/or decoded).

First Design:

In one or more embodiments, an interpolation filter based on the motion speed may be determined by obtaining its transfer function as a product of a cardinal sine function whose argument depends on the motion speed (m), and a window function, preferably a Kaiser window function as discussed above.

For example, in some embodiments the transfer function g(i) of the interpolation filter is given by the following formula, referred to herein as Equation 2:

$$g(i) = \text{sinc}\left(\frac{\pi(i+p)}{D(m)}\right) \cdot w(i+p)$$

where i is a discrete time value, * represents a discrete convolution operator, defined by the following formula for the convolution of two discrete valued functions f and g:

$f(i)*g(i)=\Sigma_{m=-\infty}^{\infty} f(m) \cdot g(i-m)$, and · is the regular multiplication.

As for Equation 1, the symbols used in Equation 2 are defined as follows:

sinc is the cardinal sine function, which may be defined as:

$$\text{sinc}(x) = \frac{\sin(x)}{x};$$

D(m) is a low-pass factor of the sinc function which depends on the motion speed value m;

p is a fractional phase offset, which indicates a fractional pixel position;

w is a windowing function that is symmetric around zero and has a zero value outside the range of plus or minus L (2*L being the number of taps of the filter) and nonzero within that range, except possibly at the extreme boundaries.

In some embodiments, D(m) may be obtained as:

$D(m)=j+k \cdot m$ where real coefficients j and k can take any positive real number, for example 0.9, 1, or 1.1, and 0.01, or 0.001 respectively.

As discussed above with respect to the motion speed value m, m may be obtained in some embodiments, based on abs($\vec{mv}$), where abs($\vec{mv}$) may be obtained based on the absolute value of the component of the motion vector in the direction of the interpolation (e.g., horizontal or vertical), for example as: m=abs($\vec{mv}$).

That is, D(m) may be obtained in some embodiments as: D(m)=j+k·abs($\vec{mv}$), where abs($\vec{mv}$) is based on an absolute value of the component of the motion vector in the direction of the interpolation (e.g. horizontal or vertical), and j and k are two positive real numbers.

In other embodiments, D(m) may be obtained as:

$$D(m) = j + k \cdot \frac{\text{abs}(\vec{mv})}{\Delta t},$$

where Δt is an estimate of the time difference between the current frame and the reference frame, abs($\vec{mv}$) is based on an absolute value of the component of the motion vector in the direction of the interpolation (e.g. horizontal or vertical), and j and k are two positive real numbers.

Equation 2 may be seen as a particular case of Equation 1 above, in which rect is a Dirac delta function.

Figure 7A:
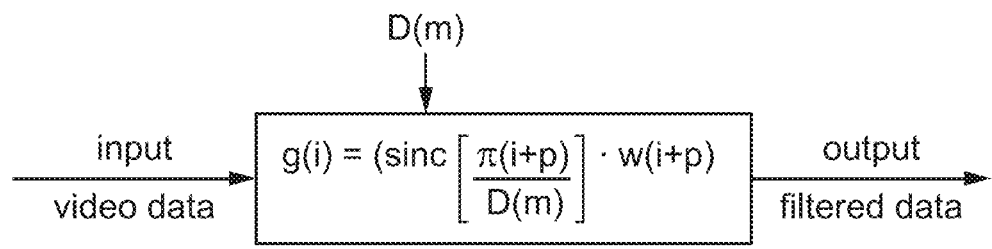
FIGS. 7(a)-7(d) are block diagrams that illustrate the operations of respective filter designs in accordance with one or more embodiments.

FIG. 7(a) illustrates the filtering of input video data by a filter corresponding to the first design, to generate output filtered data. In embodiments where such filter is used as MAIF interpolation filter, the input video data may comprise a sequence of integer pixel values (corresponding to luma sample positions and/or chroma sample positions), and the output filtered data comprise fractional pixel values obtained from the interpolated integer pixel values. A D(m) parameter may also be provided in embodiments as control parameter for the configuration of the filter.

Second Design:

In one or more embodiments, an interpolation filter based on the motion speed may be determined by obtaining its transfer function as a product of a cardinal sine function whose argument does not depend on the motion speed (m) convolved with a rectangular window function whose width $w_{rect}(m)$ depends on m, and a window function, preferably a Kaiser window function as discussed above.

For example, in some embodiments the transfer function g(i) of the interpolation filter is given by the following formula, referred to herein as Equation 3:

$$g(i) = \left(\text{sinc}\left(\frac{\pi(i+p)}{D}\right) * \text{rect}_m(i)\right) \cdot w(i+p)$$

where i is a discrete time value, * represents a discrete convolution operator, defined by the following formula for the convolution of two discrete valued functions f and g:

$f(i)*g(i)=\Sigma_{m=-\infty}^{\infty} f(m) \cdot g(i-m)$, and · is the regular multiplication.

The symbols used in Equation 3 are defined in the same manner as corresponding symbols defined for Equation 1.

Further, $\text{rect}_m(i)$ is a rectangular window function, with a width $w_{rect}(m)$ which also depends on m, designed to control motion blur by convoluting with the cardinal sine function. A suitable rectangular window function can be defined as follows:

$$rect_m(i) = \begin{cases} 1, & |i| \le w_{rect}(m) \\ 0, & \text{otherwise} \end{cases}$$

w is a windowing function that is symmetric around zero and has a zero value outside the range of plus or minus L (2*L being the number of taps of the filter) and nonzero within that range, except possibly at the extreme boundaries.

In these embodiments, the sinc function does not depend on m. As a consequence Equation 3 may be seen as a particular case of Equation 1 above, in which D(m)=D, where D is a real positive number, for example 1.0 or 1.1.

The width of the rectangular window $w_{rect}$ may in some embodiments be obtained as follows:

$$w_{rect}(m) = m \cdot l$$

where the coefficient l is a real positive number which may vary based on video camera configuration. For example, values that can be used for the coefficient l include 0.025, 0.05 and 0.1.

As discussed above with respect to the motion speed value m, m may be obtained in some embodiments, based on $abs(\vec{mv})$, where $abs(\vec{mv})$ may be obtained based on the absolute value of the component of the motion vector in the direction of the interpolation (e.g., horizontal or vertical), for example as: $m=abs(\vec{mv})$.

That is, $w_{rect}(m)$ may be obtained in some embodiments as: $w_{rect}(m)=abs(\vec{mv}) \cdot l$, where $abs(\vec{mv})$ is based on the absolute value of the component of the motion vector in the direction of the interpolation, and l is a positive real number, which may be chosen based on a configuration of the video camera used for capturing the video content (e.g. 0.025, 0.05, or 0.1).

In other embodiments, $w_{rect}(m)$ may be obtained as:

$$w_{rect}(m) = l \cdot \frac{abs(\vec{mv})}{\Delta t},$$

where Δt is an estimate of the time difference between the current frame and the reference frame, $abs(\vec{mv})$ is based on the absolute value of the component of the motion vector in the direction of the interpolation, and l is a positive real number, which may be chosen based on a configuration of the video camera used for capturing the video content (e.g. 0.025, 0.05, or 0.1).

Figure 7B:
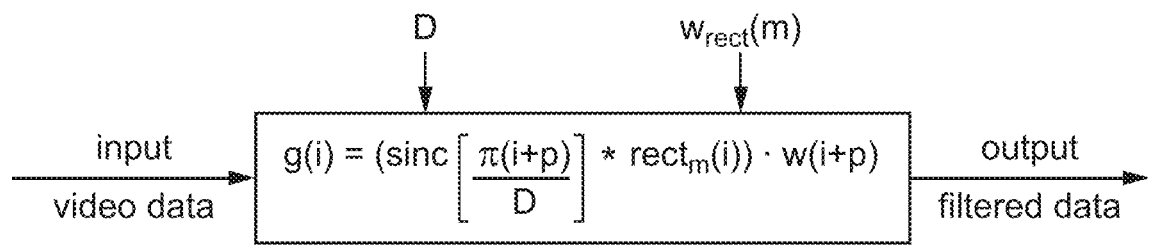

FIG. 7(b) illustrates the filtering of input video data by a filter corresponding to the second design, to generate output filtered data. In embodiments where such filter is used as MAIF interpolation filter, the input video data may comprise a sequence of integer pixel values (corresponding to luma sample positions and/or chroma sample positions), and the output filtered data comprise fractional pixel values obtained from the interpolated integer pixel values. D and $w_{rect}(m)$ or, depending on the embodiment, D and m parameters may also be provided in embodiments as control parameter for the configuration of the filter.

Third Design:

In one or more embodiments, an interpolation filter based on the motion speed may be determined by obtaining its transfer function as a product of a cardinal sine function whose argument depends on the motion speed (m) convolved with a rectangular window function whose width $w_{rect}(m)$ also depends on m, and a window function, preferably a Kaiser window function as discussed above.

For example, in some embodiments the transfer function g(i) of the interpolation filter is given by the following formula, referred to herein as Equation 4:

$$g(i) = \left(\text{sinc}\left(\frac{\pi(i+p)}{D(m)}\right) * rect_m(i)\right) \cdot w(i+p)$$

The symbols used in Equation 4 are defined in the same manner as corresponding symbols defined for Equation 1.

Depending on the embodiment, D(m) may be obtained as described above with respect to the first design, and may for example in some embodiments be obtained as:

$$D(m) = j + k \cdot abs(\vec{mv})$$

where $abs(\vec{mv})$ is a value of a norm of the motion vector (e.g. $abs(\vec{mv})$ corresponds to the absolute value of the component of the motion vector in the direction of the interpolation (e.g. horizontal or vertical)), and where real coefficients j and k can take any positive real value, for example 0.9, 1, or 1.1, and 0.01, or 0.001 respectively.

In other embodiments, D(m) may be obtained as:

$$D(m) = j + k \cdot \frac{abs(\vec{mv})}{\Delta t},$$

where Δt is an estimate of the time difference between the current frame and the reference frame, $abs(\vec{mv})$ is based on the absolute value of the component of the motion vector in the direction of the interpolation, and j and k are two positive real numbers.

According to an exemplary embodiment, D(m) may be chosen as follows:

$$D(m) = 1.0 + 0.01 * abs(\vec{mv})$$

According to another exemplary embodiment, D(m) may be chosen as follows:

$$D(m) = 1.1 + 0.01 * abs(\vec{mv}),$$

which gives an overall blurrier filter, useful for low delay applications

In some embodiments, the selection of a D(m) parameter definition, such as the above-mentioned ones, may be signaled at the frame level and used for all blocks of the frame.

The width of the rectangular window $w_{rect}$ may, depending on the embodiment be obtained as described above with respect to the second design, and may for example in some embodiments be obtained as follows:

$$w_{rect} = abs(\vec{mv}) * l$$

where $abs(\vec{mv})$ is based on the absolute value of the component of the motion vector in the direction of the interpolation (e.g. horizontal or vertical), and the coefficient l is a real positive number which can vary based on video camera configuration. The values of the coefficient l which can be used for example are 0.025, 0.05 or 0.1.

Figure 7C:
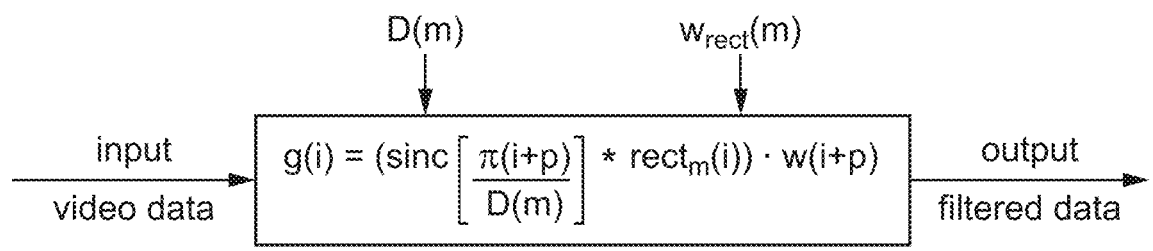

FIG. 7(c) illustrates the filtering of input video data by a filter corresponding to the third design, to generate output filtered data. In embodiments where such filter is used as MAIF interpolation filter, the input video data may comprise a sequence of integer pixel values (corresponding to luma sample positions and/or chroma sample positions), and the output filtered data comprise fractional pixel values obtained from the interpolated integer pixel values. D(m) and $w_{rect}$(m) parameters or, depending on the embodiment, a m parameter may also be provided in embodiments as control parameter for the configuration of the filter.

Fourth Design:

In one or more embodiments, an interpolation filter based on the motion speed may be determined by obtaining its transfer function by multiplying a sinc function with a window function (preferably a Kaiser window function). In some embodiments, the sinc function may be convoluted in the time domain with a (e.g. rectangular) window function, whose length may be chosen dependent on a motion speed for the current block, for example through being proportional to a norm of a motion vector calculated for the current block.

As discussed above, the transfer function g(i) of the proposed motion adaptive interpolation filter may be defined as:

$$g(i) = \left(\text{sinc}\left(\frac{\pi(i+p)}{D(m)}\right) * rect_m(i)\right) \cdot w(i+p)$$

where * represents convolution as defined above, and · represents the regular multiplication.

In some embodiments, the D(m) factor may be chosen of the form $$D(m) = j + k \cdot \text{abs}(\vec{mv})$$

where $\text{abs}(\vec{mv})$ is based on the absolute value of the component of the motion vector in the direction of the interpolation (e.g. horizontal or vertical), and j and k may be any positive real number.

In the specific case where j=1, and k=0, leading to D=1, the transfer function g(i) of the proposed motion adaptive interpolation filter may be expressed as by the following formula, referred to herein as Equation 5:

$$g(i) = (\text{sinc}(\pi(i+p)) * rect_m(i)) \cdot w(i+p)$$

The symbols used in Equation 5 are defined in the same manner as corresponding symbols defined for Equation 1.

Figure 7D:
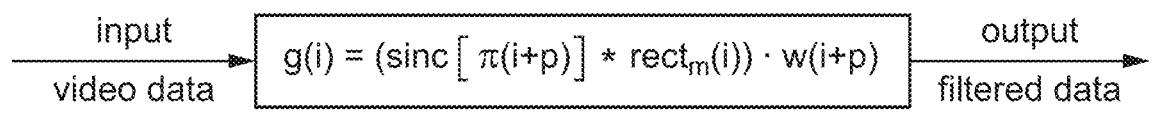

FIG. 7(d) illustrates the filtering of input video data by a filter corresponding to the fourth design, to generate output filtered data. In embodiments where such filter is used as MAIF interpolation filter, the input video data may comprise a sequence of integer pixel values (corresponding to luma sample positions and/or chroma sample positions), and the output filtered data comprise fractional pixel values obtained from the interpolated integer pixel values. A $w_{rect}$(m) parameter or, depending on the embodiment, an m parameter may also be provided in embodiments as control parameter for the configuration of the filter.

Specific examples of a usable rectangular window are now described.

The width of the rectangular window $w_{rect}$ may in some embodiments be determined as follows:

$$w_{rect} = \text{abs}(\vec{mv}) * l$$

where $\text{abs}(\vec{mv})$ corresponds to, as discussed above, an absolute value of the component of the motion vector in the direction of the interpolation (e.g. horizontal or vertical), and the coefficient l is a real value which can vary on camera configuration. Indeed, the size of the window as dependent on the motion vector advantageously represents by how much an object moved between the opening and the closing of the shutter.

The value of the coefficient l may for example be set to: l=0.025.

An exemplary Kaiser window usable in some embodiments will now be described:

The parameters used for the Kaiser window may in some embodiments be set as follows:

The value of the β parameter may be set to β=2.75. The value chosen for the L parameter may be based on a number of taps of the filter. Because of hardware implementation, which was already adapted to 8-taps filters in HEVC, it is recommended to use once again 8-taps filters, implying the value of parameter L=4.

Figure 8A:
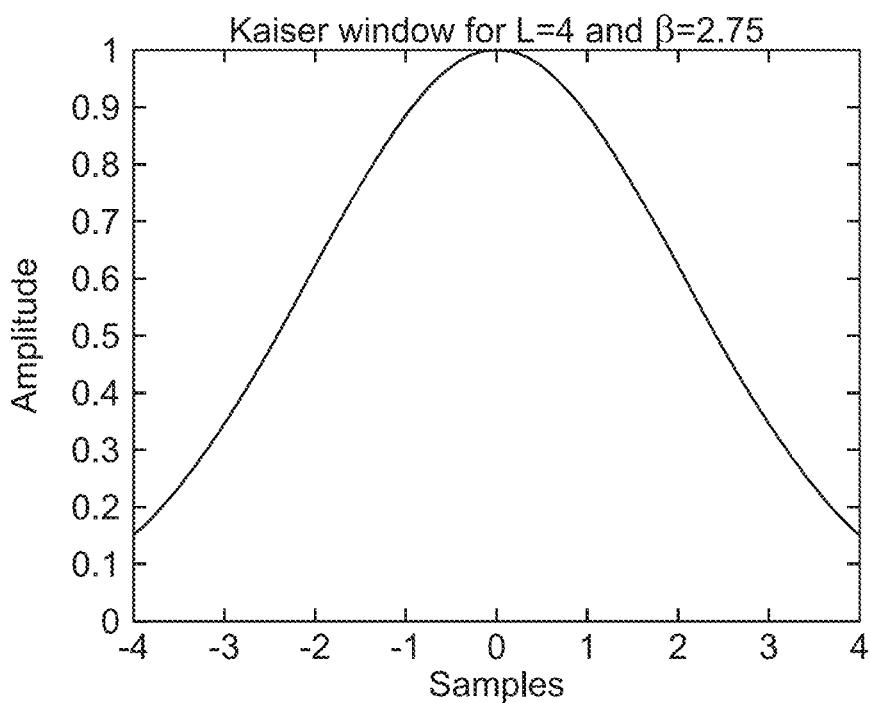
FIG. 8(a) is a plot diagram of a transfer function of a Kaiser window in accordance with one or more embodiments.

This window function is symmetric around 0 and does not have zero values for bandwidth values −4 and 4, as can be seen on the impulse response in the time domain illustrated on FIG. 8(a).

In temporal pixel prediction schemes (e.g. inter prediction), interpolation is typically performed separately for horizontal and vertical values. The choice of different filter coefficients for different motion speeds may therefore advantageously also be done separately. For example, if the motion vector is $\vec{mv}$=(23,4), pixel values should preferably be interpolated smoother in the horizontal direction because the x-value is greatly larger than the y-value of the motion vector. In the vertical direction pixel values should preferably be interpolated with a sharper filter since the y-value is smaller.

As described above, in some embodiments signaling at the frame level is used to switch between different interpolation filter definitions. For example, a frame-level signaling may be used to switch between a MAIF interpolation filter, e.g. according to the above-described first, second, third or fourth design and DCT-IF filtering used in HEVC. DCT-IF has indeed proven to be more efficient for low delay encoding configurations. In random access configurations, the MAIF interpolation filters of the present subject disclosure are much more efficient.

Figure 8B:
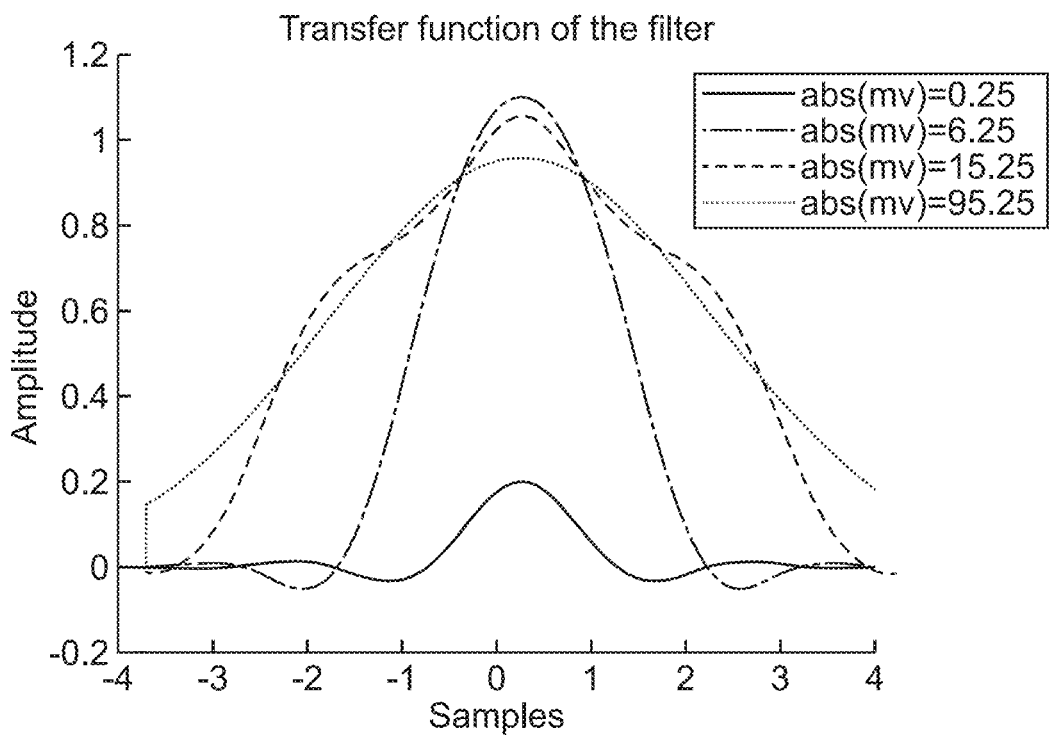
FIG. 8(b) is a plot diagram of respective transfer functions of filters in accordance with embodiments of the present subject disclosure.

FIG. 8(b) illustrates the respective transfer functions in the time domain of the fourth design MAIF filter, using a Kaiser window as shown on FIG. 7(a), for different value of abs(mv). As can be seen on FIG. 7(b), as the value of the motion vector increases, the transfer function width increases in time domain, which means that it gets narrower in the frequency domain. As a result the filter cuts off more frequencies, hence the blur in the resulting interpolation.

The proposed method may be used for the processing, for purposes of encoding or compression, or decoding or decompression, of input video data.

While the disclosed embodiments have been described with respect to preferred embodiments, those skilled in the art will readily appreciate that various changes and/or modifications can be made without departing from the spirit or scope of the invention as defined by the appended claims.

Although this disclosure sets forth certain preferred embodiments, it should be understood that certain advantages, features and aspects of the systems, devices, and methods may be realized in a variety of other embodiments.

Additionally, it is contemplated that various aspects and features described herein can be practiced separately, combined together, or substituted for one another, and that a variety of combination and sub-combinations of the features and aspects can be made and still fall within the scope of the disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method of encoding a first image in a plurality of images of input video data, wherein the first image is divided into a plurality of pixel blocks, the method comprising, for a current block of the first image:
   determining a motion speed for the current block with respect to a reference block correlated to the current block in a second image of the plurality of images, wherein the second image is distinct from the first image and was previously encoded according to an image encoding sequence for encoding the images of the plurality of images;
   determining an interpolation filter based on the motion speed;
   using the interpolation filter for calculating fractional pixel values in the second image for a temporal prediction of pixels of the current block based on the reference block of the second image,
   determining a motion vector for the current block, the motion vector pointing to the reference block in the second image;
   determining the motion speed based on the motion vector, wherein the interpolation filter is determined by obtaining its transfer function as a product of a cardinal sine function and a window function,
   wherein the argument of the cardinal sine function depends on the motion speed (m) and/or a width of a rectangular window function convolved in the time domain with the cardinal sine function depends on the motion speed (m), and
   wherein the motion speed corresponds to a speed of motion of the current block relative to the reference block in the second image.

2. The method according to claim 1, further comprising: determining the motion speed based on an absolute value of the component of the motion vector in a direction of interpolation.

3. The method according to claim 1, further comprising: determining the motion speed based on a temporal distance between the first and second images in the input video data.

4. The method according to claim 1, wherein the interpolation filter transfer function g(i) is obtained as:

$$g(i) = \mathrm{sinc}\left(\frac{\pi(i+p)}{D(m)}\right) \cdot w(i+p)$$

wherein D(m) is obtained as:

$$D(m) = j + k \cdot \mathrm{abs}(\vec{mv})$$

wherein $\mathrm{abs}(\vec{mv})$ is based on an absolute value of the component of the motion vector in a direction of interpolation, i is a discrete time value, p is a fractional phase offset which indicates a fractional pixel position, w is the window function, and wherein j and k are positive real numbers.

5. The method according to claim 1, wherein the width of the rectangular window function convolved in the time domain with the cardinal sine function depends on the motion speed (m), and wherein the interpolation filter transfer function g(i) is obtained as:

$$g(i) = \left(\mathrm{sinc}\left(\frac{\pi(i+p)}{D(m)}\right) * \mathrm{rect}_m(i)\right) \cdot w(i+p),$$

wherein i is a discrete time value, p is a fractional phase offset which indicates a fractional pixel position, w is the window function, * represents a discrete convolution operator, · is the regular multiplication, $\mathrm{rect}_m(i)$ is the rectangular window function, and D is a real positive number.

6. The method according to claim 1, wherein the argument of the cardinal sine function depends on the motion speed (m) and a width of a rectangular window function convolved in the time domain with the cardinal sine function depends on the motion speed (m), and wherein the interpolation filter transfer function g(i) is obtained as:

$$g(i) = \left(\mathrm{sinc}\left(\frac{\pi(i+p)}{D(m)}\right) * \mathrm{rect}_m(i)\right) \cdot w(i+p)$$

wherein D(m) is obtained as:

$$D(m) = j + k \cdot \mathrm{abs}(\vec{mv})$$

wherein $\mathrm{abs}(\vec{mv})$ is based on an absolute value of the component of the motion vector in a direction of interpolation, i is a discrete time value, p is a fractional phase offset which indicates a fractional pixel position, w is the window function, * represents a discrete convolution operator, · is the regular multiplication, $\mathrm{rect}_m(i)$ is the rectangular window function, and wherein j and k are positive real numbers.

7. The method according to claim 5, wherein the width ($w_{rect}$) of the rectangular window is proportional to a value which is based on an absolute value of the component of the motion vector in a direction of interpolation.

8. The method according to claim 5, wherein the width ($w_{rect}$) of the rectangular window is obtained as:

$$w_{rect} = \mathrm{abs}(\vec{mv}) \cdot l$$

wherein $\mathrm{abs}(\vec{mv})$ is based on an absolute value of the component of the motion vector in a direction of interpolation, · is the regular multiplication, and the coefficient l is a real positive number.

9. An apparatus, the apparatus comprising a processor and a memory operatively coupled to the processor, wherein the apparatus is configured to perform a method of encoding a first image in a plurality of images of input video data, wherein the first image is divided into a plurality of pixel blocks, the method comprising, for a current block of the first image:
- determining a motion speed for the current block with respect to a reference block correlated to the current block in a second image of the plurality of images, wherein the second image is distinct from the first image and was previously encoded according to an image encoding sequence for encoding the images of the plurality of images;
- determining an interpolation filter based on the motion speed;

using the interpolation filter for calculating fractional pixel values in the second image for a temporal prediction of pixels of the current block based on the reference block of the second image,
- determining a motion vector for the current block, the motion vector pointing to the reference block in the second image;
- determining the motion speed based on the motion vector, wherein the interpolation filter is determined by obtaining its transfer function as a product of a cardinal sine function and a window function,
wherein the argument of the cardinal sine function depends on the motion speed (m) and/or a width of a rectangular window function convolved in the time domain with the cardinal sine function depends on the motion speed (m), and wherein the motion speed corresponds to a speed of motion of the current block relative to the reference block in the second image.

10. A non-transitory computer-readable medium encoded with executable instructions which, when executed, causes an apparatus comprising a processor operatively coupled with a memory, to perform a method of encoding a first image in a plurality of images of input video data, wherein the first image is divided into a plurality of pixel blocks, the method comprising, for a current block of the first image:
- determining a motion speed for the current block with respect to a reference block correlated to the current block in a second image of the plurality of images, wherein the second image is distinct from the first image and was previously encoded according to an image encoding sequence for encoding the images of the plurality of images;
- determining an interpolation filter based on the motion speed;

using the interpolation filter for calculating fractional pixel values in the second image for a temporal prediction of pixels of the current block based on the reference block of the second image,
- determining a motion vector for the current block, the motion vector pointing to the reference block in the second image;
- determining the motion speed based on the motion vector, wherein the interpolation filter is determined by obtaining its transfer function as a product of a cardinal sine function and a window function,
wherein the argument of the cardinal sine function depends on the motion speed (m) and/or a width of a rectangular window function convolved in the time domain with the cardinal sine function depends on the motion speed (m), and wherein the motion speed corresponds to a speed of motion of the current block relative to the reference block in the second image.

11. The apparatus according to claim 9, wherein the method of encoding a first image further comprises: determining the motion speed based on an absolute value of the component of the motion vector in a direction of interpolation.

12. The apparatus according to claim 9, wherein the method of encoding a first image further comprises: determining the motion speed based on a temporal distance between the first and second images in the input video data.

13. The non-transitory computer-readable medium according to claim 10, wherein the method of encoding a first image further comprises: determining the motion speed based on an absolute value of the component of the motion vector in a direction of interpolation.

14. The non-transitory computer-readable medium according to claim 10, wherein the method of encoding a first image further comprises: determining the motion speed based on a temporal distance between the first and second images in the input video data.

15. The apparatus according to claim 9, wherein the interpolation filter transfer function g(i) is obtained as:

$$g(i) = \mathrm{sinc}\left(\frac{\pi(i+p)}{D(m)}\right) \cdot w(i+p)$$

wherein D(m) is obtained as:

$$D(m) = j + k \cdot \mathrm{abs}(\vec{mv})$$

wherein $\mathrm{abs}(\vec{mv})$ is based on an absolute value of the component of the motion vector in a direction of interpolation, i is a discrete time value, p is a fractional phase offset which indicates a fractional pixel position, w is the window function, and wherein j and k are positive real numbers.

16. The apparatus according to claim 9, wherein the width of the rectangular window function convolved in the time domain with the cardinal sine function depends on the motion speed (m), and wherein the interpolation filter transfer function g(i) is obtained as:

$$g(i) = \left(\mathrm{sinc}\left(\frac{\pi(i+p)}{D}\right) * rect_m(i)\right) \cdot w(i+p),$$

wherein i is a discrete time value, p is a fractional phase offset which indicates a fractional pixel position, w is the window function, * represents a discrete convolution operator, · is the regular multiplication, $rect_m(i)$ is the rectangular window function, and D is a real positive number.

17. The apparatus according to claim 9, wherein the argument of the cardinal sine function depends on the motion speed (m) and a width of a rectangular window function convolved in the time domain with the cardinal sine function depends on the motion speed (m), and wherein the interpolation filter transfer function g(i) is obtained as:

$$g(i) = \left(\mathrm{sinc}\left(\frac{\pi(i+p)}{D(m)}\right) * rect_m(i)\right) \cdot w(i+p)$$

wherein D(m) is obtained as:

$$D(m) = j + k \cdot abs(\overrightarrow{mv})$$

wherein $abs(\overrightarrow{mv})$ is based on an absolute value of the component of the motion vector in a direction of interpolation, i is a discrete time value, p is a fractional phase offset which indicates a fractional pixel position, w is the window function, * represents a discrete convolution operator, · is the regular multiplication, $rect_m(i)$ is the rectangular window function, and wherein j and k are positive real numbers.

18. The non-transitory computer-readable medium according to claim 10, wherein the interpolation filter transfer function g(i) is obtained as:

$$g(i) = sinc\left(\frac{\pi(i+p)}{D(m)}\right) \cdot w(i+p)$$

wherein D(m) is obtained as:

$$D(m) = j + k \cdot abs(\overrightarrow{mv})$$

wherein $abs(\overrightarrow{mv})$ is based on an absolute value of the component of the motion vector in a direction of interpolation, i is a discrete time value, p is a fractional phase offset which indicates a fractional pixel position, w is the window function, and wherein j and k are positive real numbers.

19. The non-transitory computer-readable medium according to claim 10, wherein the width of the rectangular window function convolved in the time domain with the cardinal sine function depends on the motion speed (m), and wherein the interpolation filter transfer function g(i) is obtained as:

$$g(i) = \left(sinc\left(\frac{\pi(i+p)}{D}\right) * rect_m(i)\right) \cdot w(i+p),$$

wherein i is a discrete time value, p is a fractional phase offset which indicates a fractional pixel position, w is the window function, * represents a discrete convolution operator, · is the regular multiplication, $rect_m(i)$ is the rectangular window function, and D is a real positive number.

20. The non-transitory computer-readable medium according to claim 10, wherein the argument of the cardinal sine function depends on the motion speed (m) and a width of a rectangular window function convolved in the time domain with the cardinal sine function depends on the motion speed (m), and wherein the interpolation filter transfer function g(i) is obtained as:

$$g(i) = \left(sinc\left(\frac{\pi(i+p)}{D(m)}\right) * rect_m(i)\right) \cdot w(i+p)$$

wherein D(m) is obtained as:

$$D(m) = j + k \cdot abs(\overrightarrow{mv})$$

wherein $abs(\overrightarrow{mv})$ is based on an absolute value of the component of the motion vector in a direction of interpolation, i is a discrete time value, p is a fractional phase offset which indicates a fractional pixel position, w is the window function, * represents a discrete convolution operator, · is the regular multiplication, $rect_m(i)$ is the rectangular window function, and wherein j and k are positive real numbers.

* * * * *